(12) United States Patent
Tang

(10) Patent No.: US 11,166,203 B2
(45) Date of Patent: Nov. 2, 2021

(54) WIRELESS COMMUNICATION METHOD AND APPARATUS, ACCESS NETWORK ENTITY AND TERMINAL DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 155 days.

(21) Appl. No.: 16/304,246

(22) PCT Filed: Jul. 13, 2016

(86) PCT No.: PCT/CN2016/089938
§ 371 (c)(1),
(2) Date: Nov. 23, 2018

(87) PCT Pub. No.: WO2018/010127
PCT Pub. Date: Jan. 18, 2018

(65) Prior Publication Data
US 2020/0322853 A1    Oct. 8, 2020

(30) Foreign Application Priority Data

Jul. 13, 2016  (WO) ................ PCT/CN2016/089938

(51) Int. Cl.
*H04W 36/00*   (2009.01)
*H04W 76/27*   (2018.01)
(Continued)

(52) U.S. Cl.
CPC ....... *H04W 36/0033* (2013.01); *H04W 36/08* (2013.01); *H04W 36/14* (2013.01); *H04W 76/27* (2018.02)

(58) Field of Classification Search
CPC . H04W 36/0033; H04W 36/14; H04W 36/08; H04W 76/27; H04W 4/24
See application file for complete search history.

(56) References Cited

U.S. PATENT DOCUMENTS

2009/0225725 A1   9/2009   Zhu
2010/0238799 A1   9/2010   Sebire
(Continued)

FOREIGN PATENT DOCUMENTS

CN    101047987 A    10/2007
CN    102006655 A     4/2011
(Continued)

OTHER PUBLICATIONS

International Search Report in international application No. PCT/CN2016/089938, dated Mar. 17, 2017.
(Continued)

*Primary Examiner* — Diane D Mizrahi
(74) *Attorney, Agent, or Firm* — Ladas & Parry, LLP

(57) ABSTRACT

Provided are a method for wireless communication and apparatus, a terminal device and an access network entity. The method includes: a first access network entity receives a transmission indication message from a terminal device, the transmission indication message carrying context information of the terminal device and/or identification information of a second access network entity; and the first access network entity acquires the context information of the terminal device according to the transmission indication message so as to establish a connection between the terminal device and the first access network entity. According to the method, the apparatus, the terminal device and the access network entity provided by the embodiments, the electricity
(Continued)

consumption and the network overhead of a terminal can be saved and thus the mobility performance of the terminal is improved.

19 Claims, 8 Drawing Sheets

(51) Int. Cl.
*H04W 36/08* (2009.01)
*H04W 36/14* (2009.01)

(56) References Cited

U.S. PATENT DOCUMENTS

| | | | |
|---|---|---|---|
| 2013/0012215 A1 | 1/2013 | Seo | |
| 2013/0039339 A1 | 2/2013 | Rayavarapu | |
| 2013/0182563 A1 | 7/2013 | Johansson et al. | |
| 2013/0183974 A1 | 7/2013 | Johansson et al. | |
| 2013/0208699 A1 | 8/2013 | Haekkinen | |
| 2015/0245405 A1 | 8/2015 | Johansson et al. | |
| 2015/0245406 A1 | 8/2015 | Johansson et al. | |
| 2015/0245407 A1 | 8/2015 | Johansson et al. | |
| 2016/0037579 A1 | 2/2016 | Jung et al. | |
| 2016/0183324 A1* | 6/2016 | Chitrapu | H04W 72/12 370/338 |
| 2018/0084021 A1* | 3/2018 | Rubin | H04L 65/60 |

FOREIGN PATENT DOCUMENTS

| | | |
|---|---|---|
| CN | 102083039 A | 6/2011 |
| CN | 103945465 A | 7/2014 |
| CN | 105704764 A | 6/2016 |
| EP | 2557889 A1 | 2/2013 |
| EP | 2617261 A1 | 7/2013 |
| EP | 2978261 A1 | 1/2016 |
| EP | 2617261 B1 | 10/2016 |
| EP | 2557889 B1 | 7/2019 |
| JP | 2014207582 A | 10/2014 |
| JP | 2015500596 A | 1/2015 |
| JP | 2018504834 A | 2/2018 |
| WO | 2011063290 A1 | 5/2011 |
| WO | 2012034580 A1 | 3/2012 |
| WO | 2012136374 A2 | 10/2012 |
| WO | 2016095139 A1 | 6/2016 |
| WO | 2016106740 A1 | 7/2016 |

OTHER PUBLICATIONS

Written Opinion of the International Search Authority in international application No. PCT/CN2016/089938, dated Mar. 17, 2017
Supplementary European Search Report in the European application No. 16908455.5, dated Mar. 27, 2019.
English translation of the Written Opinion of the International Search Authority in the international application No. PCT/CN2016/089938, dated Mar. 17, 2017.
First Office Action of the Japanese application No. 2018-565019, dated May 29, 2020.
First Office Action of the Chinese application No. 201680086183.0, dated Jun. 2, 2020.
First Office Action of the European application No. 16908455.5, dated Aug. 21, 2020.
Samsung; "RRC states for Next Radio", 3GPP TSG-RAN WG2 Meeting #94, R2-163486, Nanjing, China, May 23-27, 2016.
Ericsson; "Handling of inactive UEs", 3GPP TSG-RAN WG2 #94, Tdoc R2-163998, Nanjing, P.R.China, May 23-27, 2016.
Ericsson; "Summary of email discussion [93bis#30][LTE/CIOT opt] solution", 3GPP TSG-RAN WG2 #94, Tdoc R2-164171, Nanjing, China, May 23-27, 2016.
Office Action of the Indian application No. 201917000520, dated Sep. 25, 2020.
NTT Docomo, Inc., "UE context fetch for improved RLF recovery", 3GPP TSG-RAN WG2#84, R2-134187, dated Nov. 15, 2013.
Second Office Action of the Chinese application No. 201680086183.0, dated Dec. 1, 2020.
Office Action of the Taiwanese application No. 106123271, dated Oct. 30, 2020.
Third Office Action of the Chinese application No. 201680086163.0, dated May 17, 2021.
Second Office Action of the Taiwanese application No. 106123271, dated May 31, 2021.

* cited by examiner

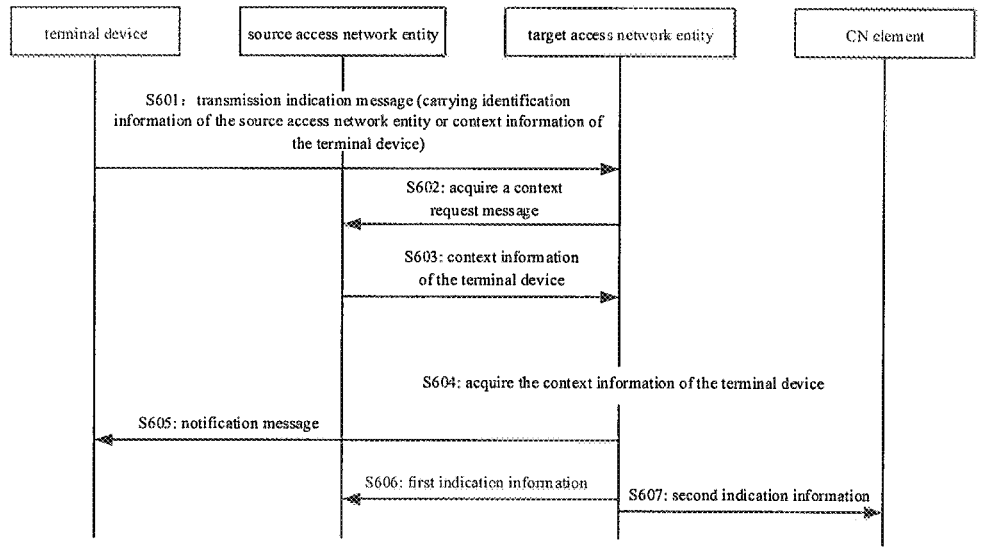

WIRELESS COMMUNICATION METHOD AND APPARATUS, ACCESS NETWORK ENTITY AND TERMINAL DEVICE

The present application is the U.S. national phase of PCT Application PCT/CN2016/089938 filed on Jul. 13, 2016, entitled "WIRELESS COMMUNICATION METHOD AND APPARATUS ACCESS NETWORK ENTITY AND TERMINAL DEVICE", the disclosure of which is hereby incorporated by reference in its entirety.

TECHNICAL FIELD

The disclosure relates to the field of communications, and particularly relates to a method and apparatus for wireless communication, an access network entity and a terminal device.

BACKGROUND

In an existing Long Term Evolution (LTE) system, after a terminal device establishes a connection with a network, an access network entity serving the terminal device will establish corresponding service information for the terminal device, and will acquire corresponding capability information of the terminal device from a Core Network (CN) element or a terminal device side. The access network entity provides a corresponding service for the terminal based on these information.

When a terminal device using a network service moves from a cell covered by one access network entity to a cell covered by another access network entity, in order to guarantee the continuity and the service quality of communication, the terminal device needs to restore a connection between the terminal device and the access network entity by handover. However, concerning solutions in the conventional art, the network overhead is large.

SUMMARY

In view of this, the disclosure discloses a method and apparatus for wireless communication, an access network entity and a terminal device, which may save electricity consumption and network overhead of a terminal and thus improves the mobility performance of the terminal.

A first aspect provides a method for wireless communication, which includes: a first access network entity receives a transmission indication message from a terminal device, the transmission indication message carrying context information of the terminal device and/or identification information of a second access network entity; and the first access network entity acquires the context information of the terminal device according to the transmission indication message so as to establish a connection between the terminal device and the first access network entity.

The terminal device directly transmits the transmission indication message to the first access network entity and the context information of the terminal device or the identification information of the second access network entity is carried in the transmission indication message, so that the first access network entity acquires the context information of the terminal device, i.e., the connection between the terminal device and each access network entity is restored, to save the electricity consumption and the network overhead of a terminal and thus improve the mobility performance of the terminal.

In combination with the first aspect, in a first possible implementation of the first aspect, when the transmission indication message carries the identification information of the second access network entity, the operation that the first access network entity acquires the context information of the terminal device according to the transmission indication message includes: the first access network entity transmits a request message for requesting to acquire the context information of the terminal device to the second access network entity according to the identification information; and the first access network entity receives the context information of the terminal device from the second access network entity.

In combination with the first aspect or any implementation of the first aspect, in a second possible implementation of the first aspect, when the transmission indication message carries the context information of the terminal device, the operation that the first access network entity acquires the context information of the terminal device according to the transmission indication message includes: the first access network entity acquires the context information of the terminal device from the transmission indication message.

In combination with the first aspect or any implementation of the first aspect, in a third possible implementation of the first aspect, after the first access network entity acquires the context information of the terminal device according to the transmission indication message, the method further includes: the first access network entity transmits a notification message to the terminal device, the notification message being configured to notify the terminal device that the first access network entity has established the connection for the terminal device.

In combination with the first aspect or any implementation of the first aspect, in a fourth possible implementation of the first aspect, after the first access network entity acquires the context information of the terminal device according to the transmission indication message, the method further includes: the first access network entity transmits first indication information to the second access network entity, the first indication information being configured to instruct the second access network entity to delete the context information of the terminal device, and/or the first access network entity transmits second indication information to a CN element, the second indication information being configured to instruct the CN element to delete a path between the CN element serving the terminal device and the second access network entity and establish a path between the CN element serving the terminal device and the first access network entity.

A second aspect provides a method for wireless communication, which includes: a second access network entity receives a message from a first access network entity for requesting to acquire context information of a terminal device; and the second access network entity transmits the context information of the terminal device to the first access network entity according to the message for requesting to acquire the context information of the terminal device.

The terminal device directly transmits a transmission indication message to the first access network entity and identification information of the second access network entity is carried in the transmission indication message, so that the first access network entity acquires the context information of the terminal device from the second access network entity, i.e., the connection between the terminal device and each access network entity is restored, to save the electricity consumption and the network overhead of a terminal and thus improve the mobility performance of the terminal.

In combination with the second aspect, in a first possible implementation of the second aspect, after the second access network entity transmits the context information of the terminal device to the first access network entity, the method further includes: the second access network entity deletes the context information of the terminal device, and/or the first access network entity transmits second indication information to a CN element, the second indication information being configured to instruct the CN element to delete a path between the CN element serving the terminal device and the second access network entity and establish a path between the CN element serving the terminal device and the first access network entity.

In combination with the second aspect or any implementation of the second aspect, in a third possible implementation of the second aspect, the second access network entity receives first indication information from the first access network entity, the first indication information being configured to instruct the second access network entity to delete the context information of the terminal device; and the second access network entity deletes the context information of the terminal device according to the first indication information, and/or the second access network entity transmits second indication information to the CN element according to the first indication information, the second indication information being configured to instruct the CN element to delete a path between the CN element serving the terminal device and the second access network entity and establish a path between the CN element serving the terminal device and the first access network entity.

A third aspect provides a method for wireless communication, which includes: a terminal device determines a transmission indication message, the transmission indication message carrying identification information of a second access network entity and/or context information of the terminal device; and the terminal device transmits the transmission indication message to a first access network entity, so that the first access network entity acquires the context information of the terminal device according to the transmission indication message.

The terminal device directly transmits the transmission indication message to the first access network entity and the context information of the terminal device or the identification information of the second access network entity is carried in the transmission indication message, so that the first access network entity acquires the context information of the terminal device, i.e., the connection between the terminal device and each access network entity is restored, to save the electricity consumption and the network overhead of a terminal and thus improve the mobility performance of the terminal.

In combination with the third aspect, in a first possible implementation of the third aspect, before the terminal device transmits the transmission indication message to the first access network entity, the method further includes: the terminal device determines an access network entity serving the terminal device to be the first access network entity.

In combination with the third aspect or any implementation of the third aspect, in a second possible implementation of the third aspect, the method further includes: the terminal device receives a notification message from the first access network entity, the notification message being configured to notify the terminal device that the first access network entity has established a connection for the terminal device.

In combination with the third aspect or any implementation of the third aspect, in a third possible implementation of the third aspect, that the terminal device transmits the transmission indication message to a first access network entity includes: when the terminal device determines existence of uplink data or uplink signaling to be transmitted, the terminal device transmits the transmission information message to the first access network entity.

When the uplink data or uplink signaling is sent, the terminal device directly transmits context information of the terminal device or identification information of a second access network entity to the first access network entity, so that the first access network entity can directly acquire the context information of the terminal device from the terminal device or acquires the context information of the terminal device from the second access network entity according to the identification information; and thus, the electricity consumption and the network overhead of a terminal can be saved and the mobility performance of the terminal is improved.

A fourth aspect provides a method for wireless communication, which includes: a first access network entity receives a transmission indication message from a second access network entity, the transmission indication message being configured to indicate existence of downlink data or downlink signaling to be transmitted to a terminal device and the transmission information message carrying context information of the terminal device; and the first access network entity acquires the context information of the terminal device from the transmission indication message so as to establish a connection between the first access network entity and the terminal device.

The second access network entity directly transmits the transmission indication message to the first access network entity and the context information of the terminal device is carried in the transmission indication message, so that the first access network entity acquires the context information of the terminal device, i.e., the connection between the terminal device and each access network entity is restored, to save the electricity consumption and the network overhead of a terminal and thus improve the mobility performance of the terminal.

Alternatively, that the second access network entity transmits the context information of the terminal device to the first access network entity may include a scene in which the downlink data or downlink signaling is transmitted at the second access network entity, or may be a scene in which the second access network entity purely attempt to transmit stored context information of the terminal device to the first access network entity.

In combination with the fourth aspect, in a first possible implementation of the fourth aspect, before the first access network entity acquires the context information of the terminal device, the method further includes: the first access network entity transmits a confirmation request message to the terminal device according to the transmission indication message, the confirmation request message being configured to confirm whether the first access network entity is an access network entity currently serving the terminal device or not; and the first access network entity receives a confirmation response message from the terminal device, the confirmation response message being configured to indicate that the first access network entity is the access network entity currently serving the terminal device.

In combination with the fourth aspect or any implementation of the fourth aspect, in a second possible implementation of the fourth aspect, after the first access network entity receives the confirmation response message from the terminal device, the method further includes: the first access network entity transmits first indication information to the second access network entity, the first indication information being configured to instruct the second access network entity to delete the context information of the terminal device and/or indicating the second access network entity of transmitting the downlink data or downlink signaling to be transmitted to the first access network entity, and/or the first access network entity transmits second indication information to a CN element, the second indication information being configured to instruct the CN element to delete a path between the CN element serving the terminal device and the second access network entity and establishing a path between the CN element serving the terminal device and the first access network entity.

In combination with the fourth aspect or any implementation of the fourth aspect, in a third possible implementation of the fourth aspect, the confirmation request message carries timing information of a timer or a counter; the method further includes: if a time set by the timer or the counter is overtime, the first access network entity terminates to transmit the confirmation request message to the terminal device.

Alternatively, the confirmation request message is transmitted within a time quantum set by the timer or the counter.

A fifth aspect provides a method for wireless communication, which includes: a second access network entity determines that downlink data or downlink signaling to be transmitted to a terminal device exists; and the second access network entity transmits a transmission indication message to at least one access network entity, the transmission indication message being configured to existence of the downlink data or downlink signaling to be transmitted to the terminal device and the transmission indication message carrying context information of the terminal device.

The second access network entity transmits the transmission indication message to multiple access network entities including the first access network entity and the context information of the terminal device is carried in the transmission indication message, so that the first access network entity acquires the context information of the terminal device, i.e., the connection between the terminal device and each access network entity is restored, to save the electricity consumption and the network overhead of a terminal and thus improve the mobility performance of the terminal.

In combination with the fifth aspect, in a first possible implementation of the fifth aspect, the at least one access network entity includes the first access network entity and the first access network entity is an access network entity currently serving the terminal device; the method further includes: the second access network entity receives first indication information from the first access network entity, the first indication information being configured to instruct the second access network entity to delete the context information of the terminal device and/or indicating the second access network entity of transmitting the downlink data or downlink signaling to be transmitted to the first access network entity; and the second access network entity deletes the context information of the terminal device and/or transmits the downlink data or downlink signaling to be transmitted to the first access network entity according to the first indication information.

In combination with the fifth aspect or any implementation of the fifth aspect, in a second possible implementation of the fifth aspect, after the second access network entity receives the first indication information, the method further includes: the second access network entity transmits second indication information to a CN element, the second indication information being configured to instruct the CN element to delete a path between the CN element serving the terminal service and the second access network entity and establish a path between the CN element serving the terminal device and the first access network entity, and/or the second access network entity notifies each access network entity in the at least one access network entity to terminate transmission of a confirmation request message to the terminal device, the confirmation request message being configured to confirm whether the corresponding access network entity is an access network entity currently serving the terminal device or not.

A sixth aspect provides an apparatus, which is configured to execute the method in the first aspect or any possible implementation of the first aspect. Specifically, the apparatus includes a unit for executing the method in the first aspect or any possible implementation of the first aspect.

A seventh aspect provides an apparatus, which is configured to execute the method in the second aspect or any possible implementation of the second aspect. Specifically, the apparatus includes a unit for executing the method in the second aspect or any possible implementation of the second aspect.

An eighth aspect provides an apparatus, which is configured to execute the method in the third aspect or any possible implementation of the third aspect. Specifically, the apparatus includes a unit for executing the method in the third aspect or any possible implementation of the third aspect.

A ninth aspect provides an apparatus, which is configured to execute the method in the fourth aspect or any possible implementation of the fourth aspect. Specifically, the apparatus includes a unit for executing the method in the fourth aspect or any possible implementation of the fourth aspect.

A tenth aspect provides an apparatus, which is configured to execute the method in the fifth aspect or any possible implementation of the fifth aspect. Specifically, the apparatus includes a unit for executing the method in the fifth aspect or any possible implementation of the fifth aspect.

An eleventh aspect provides an access network entity, which includes: a memory, a processor, an input/output interface, a communication interface and a bus system. Herein, the memory, the processor, the input/output interface and the communication interface are connected via the bus system; the memory is configured to store instructions; the processor is configured to execute the instructions stored by the memory; and when the instruction is executed, the processor executes the method in the first aspect via the communication interface, and controls the input/output interface to receive input data and information and output data such as an operation result.

A twelfth aspect provides an access network entity, which includes: a memory, a processor, an input/output interface, a communication interface and a bus system. Herein, the memory, the processor, the input/output interface and the communication interface are connected via the bus system; the memory is configured to store instructions; the processor is configured to execute the instructions stored by the memory; and when the instruction is executed, the processor executes the method in the second aspect via the communication interface, and controls the input/output interface to receive input data and information and output data such as an operation result.

A thirteenth aspect provides an access network entity, which includes: a memory, a processor, an input/output interface, a communication interface and a bus system.

Herein, the memory, the processor, the input/output interface and the communication interface are connected via the bus system; the memory is configured to store instructions; the processor is configured to execute the instructions stored by the memory; and when the instructions are executed, the processor executes the method in the third aspect via the communication interface, and controls the input/output interface to receive input data and information and output data such as an operation result.

A fourteenth aspect provides an access network entity, which includes: a memory, a processor, an input/output interface, a communication interface and a bus system. Herein, the memory, the processor, the input/output interface and the communication interface are connected via the bus system; the memory is configured to store instructions; the processor is configured to execute the instructions stored by the memory; and when the instructions are executed, the processor executes the method in the fourth aspect via the communication interface, and controls the input/output interface to receive input data and information and output data such as an operation result.

A fifteenth aspect provides an access network entity, which includes: a memory, a processor, an input/output interface, a communication interface and a bus system. Herein, the memory, the processor, the input/output interface and the communication interface are connected via the bus system; the memory is configured to store instructions; the processor is configured to execute the instructions stored by the memory; and when the instructions are executed, the processor executes the method in the fifth aspect via the communication interface, and controls the input/output interface to receive input data and information and output data such as an operation result.

A sixteenth aspect provides a computer storage medium, which is configured to store computer software instructions used by the method and includes a program designed for executing the above aspects.

In the disclosure, the names of the terminal device, the access network entities and the CN element are not intended to form limits to the devices in itself. During actual implementation, these devices may appear in other names. As long as a function of each device is similar to the disclosure, all pertain to the scope of claims of the disclosure and equivalent technologies thereof.

These aspects or other aspects of the disclosure will become more readable in the description of the following embodiments.

BRIEF DESCRIPTION OF DRAWINGS

In order to describe the technical solutions in the embodiments of the disclosure more clearly, a simple introduction on the accompanying drawings which are needed in the description of the embodiments is given below. Apparently, the accompanying drawings in the description below are merely some of the embodiments of the disclosure, based on which other drawings may be obtained by those of ordinary skill in the art without any creative effort.

FIG. 6 illustrates a schematic flowchart of a method for wireless communication provided by an embodiment of the disclosure.

FIG. 7 illustrates a still another schematic block diagram of a method for wireless communication provided by an embodiment of the disclosure.

FIG. 8 illustrates a still another schematic block diagram of a method for wireless communication provided by an embodiment of the disclosure.

DETAILED DESCRIPTION

A clear and complete description of the technical solutions in the disclosure will be given below, in combination with the accompanying drawings in the embodiments of the disclosure. Apparently, the embodiments described below are a part, but not all, of the embodiments of the disclosure. All of the other embodiments, obtained by those of ordinary skill in the art based on the embodiments of the disclosure without any inventive efforts, fall into the protection scope of the disclosure.

It should be understood that the technical solutions of the disclosure may be applied in various communications systems, such as a Global System of Mobile communication (GSM) system, a Code Division Multiple Access (CDMA) system, a Wideband Code Division Multiple Access (WCDMA) system, a General Packet Radio Service (GPRS) system, an LTE system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system or a future 5G system.

Particularly, the technical solutions in the embodiments of the disclosure may be applied to various communication systems based on a non-orthogonal multiple access technology, such as a Sparse Code Multiple Access (SCMA) system and a Low Density Signature (LDS) system. Of course, the SCMA system and the LDS system may also be referred to as other names in the field of communications. Further, the technical solutions in the embodiments of the disclosure may be applied to multi-carrier transmission systems adopting the non-orthogonal multiple access technology, such as an Orthogonal Frequency Division Multiplexing (OFDM) system, a Filter Bank Multi-Carrier (FBMC) system, a Generalized Frequency Division Multiplexing (GFDM) system and a Filtered-OFDM (F-OFDM) system.

Figure 1:
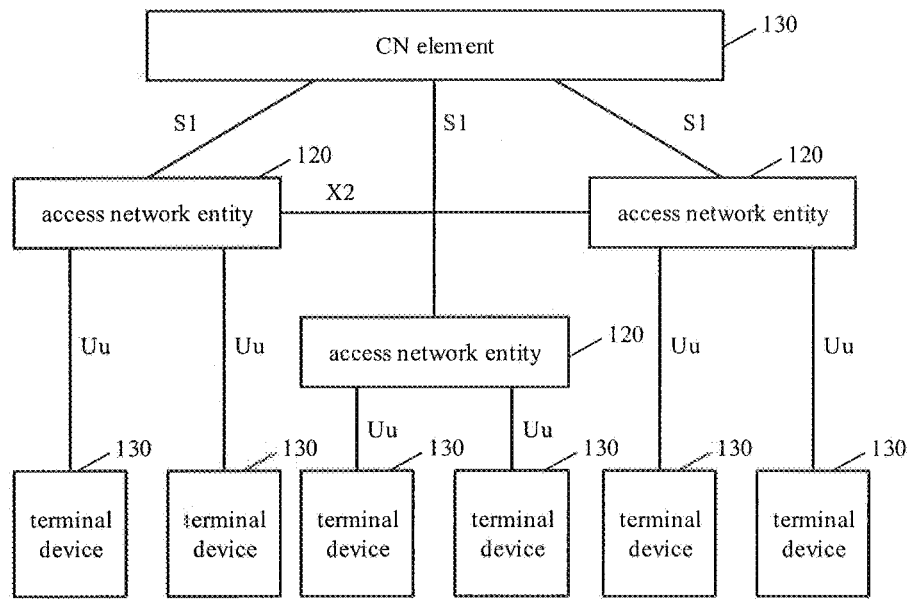
FIG. 1 illustrates a schematic diagram of an implementation environment related to embodiments of the disclosure.

FIG. 1 illustrates a schematic diagram of an implementation environment related to embodiments of the disclosure. The implementation environment includes: terminal devices 110, access network entities 120 and CN networks 130. Herein, S1 interfaces are used for communication between the access network entities and the CN elements, X2 interfaces are used for communication between the access network entities, and Uu interfaces are used for communication between the terminal devices and the access network entities.

The terminal devices 110 in the embodiments of the disclosure may communicate with one or more core networks via a Radio Access Network (RAN). Each terminal device may be called an access terminal. User Equipment (UE), a user unit, a user station, a mobile station, a mobile platform, a remote station, a remote terminal, a mobile device, a user terminal, a terminal, a wireless communication device and a user proxy or user apparatus. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices, vehicle-amounted devices and wearable devices connected to a wireless modulator-demodulator, and a terminal device in a future 5th Generation (5G) network.

The access network entities 120 are network elements in the access network. As illustrated in FIG. 1, taking the UMTS system as an example, each access network node 120 may be a node B or may be a Radio Network Controller (RNC). In an LTE wireless network architecture, each node B is an Evolved Node Base (eNB) station.

The core network elements 130 are network elements in a CN. Taking the LTE wireless network architecture as an example, each core network element 130 includes an MME and a Serving GateWay (S-GW)/PDN GateWay (P-GW). The MME is mainly used for completing mobility management and session management of the terminal devices 110. The S-GW is mainly used for forwarding data between the eNB and the P-GW, and the P-GW is mainly used for processing an Internet Protocol (IP) data service.

In an existing LTE system, after a terminal device establishes a connection with a network, an access network entity serving the terminal device will establish corresponding service information for the terminal device, and additionally, will acquire corresponding capability information of the terminal device from a CN element or the terminal device side. The access network entity provides a corresponding service for the terminal based on the information. When the terminal device performs handover, the information is taken as context information of the terminal device to be conveyed to a target access network entity from a source access network entity, and the target access network entity continues to serve the terminal device based on the context information. When the terminal device completes the data transmission, a service access network entity releases a wireless connection for the terminal device, and meanwhile, deletes the context information of the terminal device. The terminal device also deletes context information stored therein and returns to an idle state.

Figure 2:
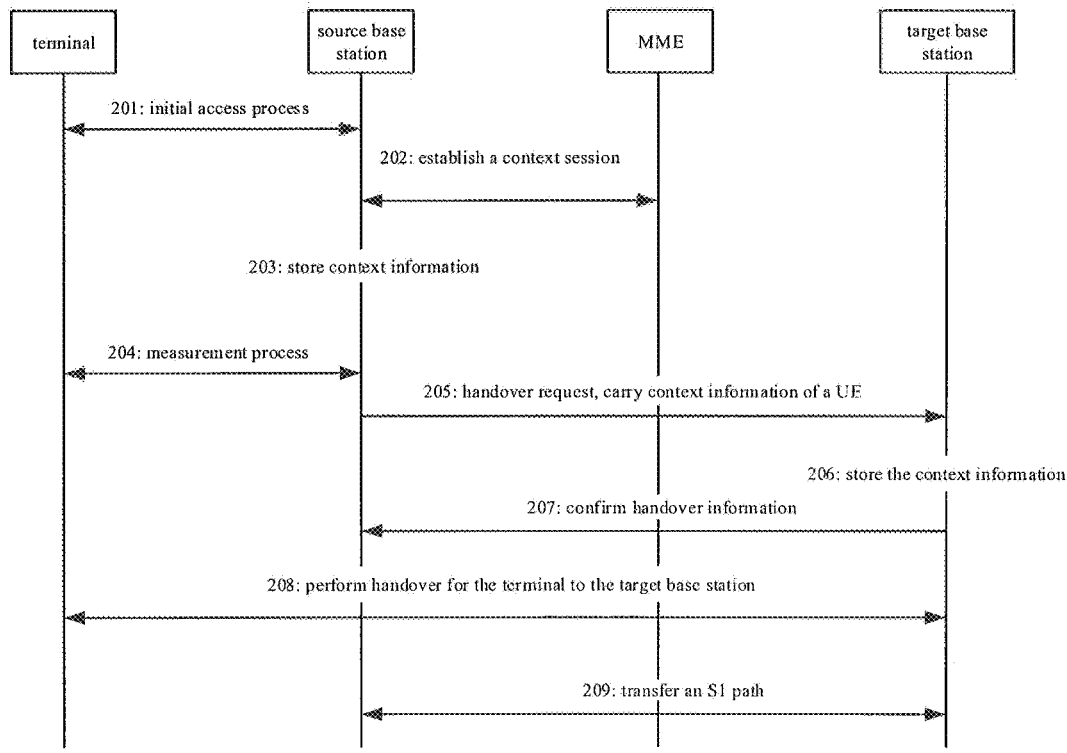
FIG. 2 illustrates a schematic flowchart of a cell handover method.

In order to understand conveniently, a simple introduction will be first given to a cell handover method in combination with FIG. 2. FIG. 2 illustrates a schematic flowchart of a cell handover method. The method illustrated in FIG. 2 includes the following actions.

At 201, a terminal completes an initial access process with a source base station (a base station to which a source cell belongs). At this moment, the terminal enters a connection state from an idle state.

At 202, the source base station establishes a context session via a Mobility Management Entity (MME) to which the terminal belongs to acquire context information of the terminal.

At 203, the source base station stores the context information of the terminal.

At 204, the terminal completes a measurement process of a neighboring cell. The terminal measures a measurement object according to configuration information transmitted by the source base station and transmits a measurement report to the source base station, so that the base station may determine whether the terminal performs cell handover or not according to the measurement report.

At 205, when the source base station determines that the terminal needs to be switched, the source base station transmits a switching request to a target base station, the switching request carrying the context information of the terminal.

At 206, the target base station stores the context information of the terminal.

At 207, the target base station transmits a switching confirmation request to the source base station.

At 208, the source base station switches the terminal to the target base station.

At 209, an S1path is transferred from the source base station to the target base station. After the terminal is accessed to the target base station, the target base station transmits a path change request to the CN element so as to notify the CN element of transferring a service of the terminal to the target base station and updating a node relationship between a user plane and a control plane.

It may be seen from the above solutions that the terminal device moves from a cell covered by the source base station to a cell covered by the target base station and the terminal device restores a connection between the terminal device and the access network entity via a switching manner. In other words, the terminal device needs to first notify the source base station; the source base station requests the target base station to switch and carry the context information of the terminal device, and the terminal device can restore the connection after multiple times of interaction. In this sense, much energy is consumed.

In a research of LTE and future wireless systems, the terminal may move independently without switching in the connection state and the moving method is similar to cell selection or cell re-selection in the LTE network. That is, the terminal may move independently according to parameters set by a network and does not notify the network (different from the switching). At this moment, the context information of the terminal is still stored by an access network entity serving the terminal previously. When the terminal performs data transmission in other access network entities, there is a need to acquire a context from the previous service access network entity via a service access network entity at this moment so as to restore the transmission.

It should be understood that, this embodiment of the disclosure is illustrated with the application in the LTE system as an example and the disclosure is not limited to this. In addition, as used herein, the terms "system" and "network" are frequently interchanged to use. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

For example, the context information of the terminal device is acquired by enabling the terminal device to trigger a target access network entity. The method for wireless communication provided by the embodiments of the disclosure will be described below respectively from the perspectives of an access network entity and a terminal device in combination with FIG. 3 to FIG. 5.

Figure 3:
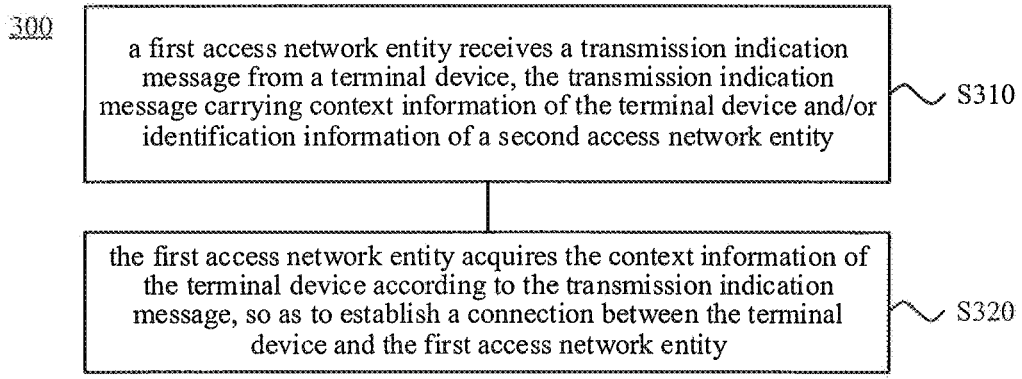
FIG. 3 illustrates a schematic block diagram of a method for wireless communication provided by an embodiment of the disclosure.

FIG. 3 illustrates a schematic block diagram of a method for wireless communication 300 provided by an embodiment of the disclosure. The method 300 illustrated in FIG. 3 includes the following actions.

At S310, a first access network entity receives a transmission indication message from a terminal device, the transmission indication message carrying context information of the terminal device and/or identification information of a second access network entity.

At S320, the first access network entity acquires the context information of the terminal device according to the transmission indication message so as to establish a connection between the terminal device and the first access network entity.

The disclosure may be applied to the connection between the terminal device and the first access network entity. However, the context information of the terminal device is stored in the second access network entity. In other words, any access network entity may be the second access network entity as long as the context information of the terminal device is stored therein. For the convenience of description, the first access network entity in this embodiment of the disclosure is referred to as a target access network entity and the second access network entity is referred to a source access network entity.

Specifically, the terminal device may trigger the target access network entity to acquire the context information of the terminal device from the source access network entity via an identifier, carried in the transmission indication message, of the source access network entity; upon the reception of a message of the target access network entity for requesting to acquire the context information of the terminal device, the source access network entity transmits the context information of the terminal device to the target access network entity; or the terminal device directly carries the context information of the terminal device in the transmission indication message, so that the target access network entity may acquire the context information of the terminal device from the transmission indication message.

It should be understood that, in this embodiment of the disclosure, the terminal device may transmit the transmission indication message when uplink data or uplink signaling exists to be transmitted, and the terminal device may also purely trigger the target access network entity to acquire the context information of the terminal device, in which a condition for triggering the target access network entity to acquire the context information of the terminal device is not defined by the disclosure.

It should be further understood that, the identification information of the source access network entity may be an identifier distributed by the CN element to the source access network entity, and may also be a path identifier between the terminal device and the source access network entity or a path identifier between the CN element and the source access network entity. Any identifying the source access network entity may be taken as the identification information in this embodiment of the disclosure, which will not be defined by the disclosure hereto.

Therefore, according to the method for wireless communication provided by this embodiment of the disclosure, the terminal device directly transmits the transmission indication message to the target access network entity and the context information of the terminal device or the identification information of the source access network entity is carried in the transmission indication message, so that the target access network entity acquires the context information of the terminal device, i.e., the connection between the terminal device and each access network entity is restored, to save the electricity consumption and the network overhead of a terminal and thus improve the mobility performance of the terminal.

Upon the reception of the transmission indication message, the target access network entity may determine how to acquire the context information of the terminal device according to whether the context information of the terminal device is carried in the transmission indication message or not; if the target access network entity analyzes that the context information of the terminal device is carried in the transmission indication message, it may acquire the context information of the terminal device from the transmission indication message directly; and if the target access network entity analyzes that the context information of the terminal device is not carried in the transmission indication message, it may transmit a request message for acquiring the context to the source access network entity according to the identification information.

It should be understood that, the transmission indication message may be a random access request message; that is, a resource request for uplink transmitting is transmitted to the target access network entity. At this moment, the terminal device may be in an idle state. However, the context information of the terminal device is stored in the terminal device or the source access network entity. Here, the state of the terminal device is not defined in the disclosure. The transmission indication message may further carry air interface identification information of the terminal device, so that the target access network entity may perform interaction with the terminal device according to the air interface identification information upon the reception of the transmission indication message.

Further, after the target access network entity acquires the context information of the terminal device according to the transmission indication message, the method further includes: the target access network entity transmits a notification message to the terminal device, the notification message being configured to notify the terminal device of that the target access network entity establishes the connection for the terminal device. If the terminal device has uplink data or uplink signaling to be transmitted at this moment, the terminal device may transmit the uplink data or uplink signaling to be transmitted to the target access network entity.

Alternatively, as an embodiment, after the target access network entity acquires the context information of the terminal device according to the transmission indication message, the method further includes: the target access network entity transmits first indication information to the source access network entity, the first indication information being configured to instruct the source access network entity to delete the context information of the terminal device.

Alternatively, as an embodiment, after the target access network entity acquires the context information of the terminal device according to the transmission indication message, the method further includes: the target access network entity transmits second indication information to a CN element, the second indication information being configured to instruct the CN element to delete a path between the CN element serving the terminal device and the second access network entity and establish a path between the CN element serving the terminal device and the first access network entity.

For example, the first indication information may be a context release message, which indicates that the terminal device is accessed to the target access network entity and can perform service communication with the target access network entity, and in order to alleviate resources of an access network entity, resources occupied by the source access network entity need to be released. The second indication information may be a path conversion request message, which indicates that the CN element is requested to update a node address of a service data channel, the CN element is notified to switch a continuous path of service data, and from the source access network entity to the target access network entity, the message carries an S1AP distributed by the source access network entity to the terminal device at an S1 port, an S1AP distributed by the target access network entity to the terminal device at the S1 port and a downlink address to be used by an Evolved Packet System (EPS) in the target access network entity. After the CN element successfully updates the node address of the data channel, a path conversion request response message is transmitted to the target access network entity, which indicates that the service communication may be performed on a new system Architecture Evolution (SAE) bearer.

It is to be noted that, the target access network entity notifies, after acquiring the context information of the terminal device, the terminal device at some moment of that the communication with the target access network entity is established. It may be appropriate that the target access network entity transmits a notification message to the terminal device after acquiring the context information of the terminal device, and may also be appropriate that the target access network entity transmits the notification message to the terminal device while transmitting the first indication information to the source access network entity or transmitting the second indication information to the CN element, all of which are not defined by the disclosure.

Figure 4:
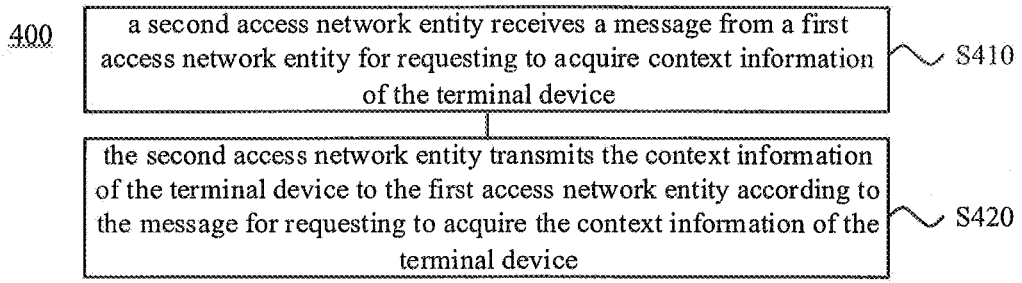
FIG. 4 illustrates another schematic block diagram of a method for wireless communication provided by an embodiment of the disclosure.

FIG. 4 illustrates a schematic block diagram of a method for wireless communication 400 provided by an embodiment of the disclosure. The method 400 illustrated in FIG. 4 includes the following actions.

At S410, a second access network entity receives a message from a first access network entity for requesting to acquire context information of the terminal device.

At S420, the second access network entity transmits the context information of the terminal device to the first access network entity according to the message for requesting to acquire the context information of the terminal device.

Specifically, in order to reduce the energy consumption of the terminal device switched from a source access network entity to a target access network entity, the terminal device transmits a transmission indication message to the target access network entity so as to trigger the target access network entity to acquire the context information of the terminal device. Since the terminal device moves independently in a connection state according parameters set by the network and the terminal device stores identification information of the source access network entity, the terminal device may carry the identification information of the source access network entity in the transmitted transmission indication message; and the target access network entity may acquire the context information of the terminal device from the source access network entity after analyzing the identification information of the access network entity.

Therefore, according to the method for wireless communication provided by this embodiment of the disclosure, the terminal device directly transmits the transmission indication message to the target access network entity and the identification information of the source access network entity is carried in the transmission indication message, so that the target access network entity acquires the context information of the terminal device from the source access network entity, i.e., the connection between the terminal device and each access network entity is restored, to save the electricity consumption and the network overhead of a terminal and thus improve the mobility performance of the terminal.

Further, after the source access network entity transmits the context information of the terminal device to the target access network entity, the method further includes: the source access network entity deletes the context information of the terminal device, and/or the source access network entity transmits second indication information to a CN element, the second indication information being configured to instruct the CN element to delete a path between the CN element serving the terminal device and the second access network entity and establishing a path between the CN element serving the terminal device and the first access network entity.

Specifically, if the transmission indication message received by the target access network entity and transmitted by the terminal device includes the context information of the terminal device, the target access network entity may require the source access network entity to delete relevant context information. At this moment, the source access network entity or the target access network entity may transmit a path change request to the CN element. If the transmission indication message received by the target access network entity and transmitted by the terminal device does not include the context information, the source access network entity deletes the context information of the terminal independently after transmitting the context information of the terminal device to the target access network entity. At this moment, the source access network entity or the target access network entity may transmit the path change request to the CN element.

It should be understood that, the first indication information and the second indication information in the method 400 are similar to those in the method 300 and will not be repeated here for the conciseness.

Figure 5:
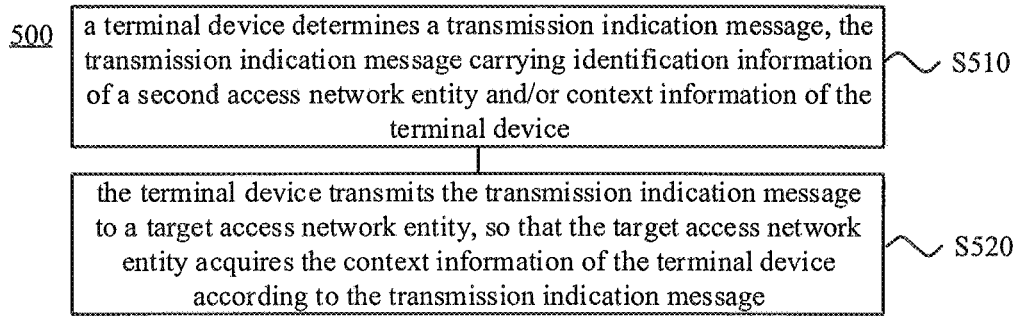
FIG. 5 illustrates a still another schematic block diagram of a method for wireless communication provided by an embodiment of the disclosure.

FIG. 5 illustrates a schematic block diagram of a method for wireless communication 500 provided by an embodiment of the disclosure. The method 500 illustrated in FIG. 5 includes the following actions.

At S510, a terminal device determines a transmission indication message, the transmission indication message carrying identification information of a second access network entity and/or context information of the terminal device.

At S520, the terminal device transmits the transmission indication message to a first access network entity, so that the first access network entity acquires the context information of the terminal device according to the transmission indication message.

Therefore, according to the method for wireless communication provided by this embodiment of the disclosure, the terminal device directly transmits the transmission indication message to the target access network entity and the identification information of the source access network entity and/or the context information of the terminal device is carried in the transmission indication message, so that the target access network entity acquires the context information of the terminal device from the source access network entity or the terminal device, i.e., the connection between the terminal device and each access network entity is restored, to save the electricity consumption and the network overhead of a terminal and thus improve the mobility performance of the terminal.

It should be understood that, other terminal information or information on the source access network entity may be carried in the transmission indication message, and the other information in the transmission indication message is not specifically defined in this embodiment of the disclosure.

After the terminal device determines to switch the access network entity, the terminal device may carry the context information of the terminal device directly in the transmission indication message transmitted to the target access network entity, or the terminal device may carry the identification information of the source access network entity in the transmission indication message transmitted to the target access network entity, so that the target access network entity acquires the context information of the terminal device from the source access network entity.

It should be understood that, in this embodiment of the disclosure, the terminal device may transmit the transmission indication message when uplink data or uplink signaling exists to be transmitted, and the terminal device may also purely trigger the target access network entity to acquire the context information of the terminal device, in which a condition for triggering the target access network entity to acquire the context information of the terminal device is not defined by the disclosure.

Further, the terminal device may further receive a notification message from the target access network entity, the notification message being configured to notify the terminal device of that the target access network entity establishes a connection for the terminal device.

Alternatively, as an embodiment, before the terminal device transmits the transmission indication message to the target access network entity, the method further includes: the terminal device determines an access network entity serving a cell where the terminal device is located as the target access network entity.

Specifically, after the terminal device moves from a source cell to a target cell, the terminal device may first perform a Radio Resource Control (RRC) connection with an access network entity where the target cell is located; and if the RRC connection is successful, it is indicated that the access network entity is the target access network entity and thus the access network entity serving the cell where the terminal device is located is determined as the target access network entity.

It should be understood that, in each embodiment of the disclosure, the sequence number of each process does not mean the precedence of the execution sequence, and the execution sequence of each process should be determined based on its function and internal logic and is not intended to form any limit to the implementation process of the embodiment of the disclosure.

The method for wireless communication 600 in the embodiments of the disclosure will be described below in detail from the perspective of interaction among a terminal device, an access network entity and a CN element in combination with FIG. 6. As illustrated in FIG. 6, the method 600 includes the following actions.

At S601, when the terminal device has data to be transmitted, the terminal device may transmit a transmission indication message to a target access network entity; if the transmission indication message carries identification information of a source access network entity, the step S602 and the step S603 are executed; and if the transmission indication message carries context information of the terminal device, the step S604 is executed directly.

At S602, upon the reception of the transmission indication message carrying the identification information of the source access network entity, the target access network entity transmits a message for requesting to acquire the context information of the terminal device to the source access network entity.

At S603, upon the reception of the message for requesting to acquire the context information of the terminal device, the source access network entity transmits a context request message of the terminal device to the target access network entity.

At S604, the target access network entity acquires the context information of the terminal device according to the step S601 or the step S603.

At S605, the target access network entity may transmit a notification message to the terminal device after acquiring the context information of the terminal device so as to notify the terminal device of a connection with the target access network entity is established.

At S606, the target access network entity may further transmit first indication information to the source access network entity after acquiring the context information of the terminal device so as to indicate the source access network entity of deleting the context information of the terminal device.

At S607, the target access network entity may further transmit second indication information to a CN element after acquiring the context information of the terminal device so as to indicate the CN element of deleting a path between the CN element serving the terminal device and the second access network entity and establishing a path between the CN element serving the terminal device and the first access network entity.

Therefore, according to the method for wireless communication provided by this embodiment of the disclosure, the terminal device directly transmits the transmission indication message to the target access network entity and the context information of the terminal device or the identification information of the source access network entity is carried in the transmission indication message, so that the target access network entity acquires the context information of the terminal device, i.e., the connection between the terminal device and each access network entity is restored, to save the electricity consumption and the network overhead of a terminal and thus improve the mobility performance of the terminal.

It should be understood that, FIG. 6 illustrates detailed actions or operations of the method for wireless communication. However, these actions or operations are merely for example, and other operations or variations of each operation in FIG. 6 may further be executed by this embodiment of the disclosure. In addition, the each step in FIG. 6 may be executed according to a sequence different from FIG. 6 and it is possible that all operations in FIG. 6 are operated unnecessarily.

In addition, in each method embodiment, the actions at a terminal device side may be independently implemented to form a method for wireless communication at the terminal device side, and the actions at the access network entity side may be independently implemented to form a method for wireless communication at the access network entity side. In each method embodiment above, the access network entity generally is a base station, the CN element generally is an MME and the terminal device generally is a user device.

The method for enabling the terminal device to trigger the target access network entity to acquire the context information of the terminal device is described above in detail, and a method for enabling the source access network entity to trigger the target access network entity to acquire the context information of the terminal device will be described below. FIG. 7 illustrates a schematic block diagram of a method for wireless communication 700 provided by an embodiment of the disclosure. The method 700 illustrated in FIG. 7 includes the following actions.

At S710, a first access network entity receives a transmission indication message from a second access network entity, the transmission indication message indicating existence of downlink data or downlink signaling to be transmitted to a terminal device and the transmission indication message carrying context information of the terminal device.

At S720, the first access network entity acquires the context information of the terminal device from the transmission indication message so as to establish a connection between the first access network entity and the terminal device.

Specifically, when a network side has data to be transmitted, a path between the CN element relevant to the terminal device and an access network entity still is a path between the CN element and the source access network entity, and the data at the network side first reach to the source access network entity. However, at this moment, the terminal device is not within a range served by the source access network entity, so the source access network entity may transmit the transmission indication message to all access network entities within a certain area around, in which the transmission indication message is configured to notify the access network entities within the area of having the data to be transmitted and the transmission indication message carries the context information of the terminal device. The certain area may be an area affected by the source access network entity. In other words, the source access network entity may affect all access network entities in the area to transmit the transmission indication message.

It should be understood that, in this embodiment of the disclosure, the source access network entity may transmit the transmission indication message when uplink data or uplink signaling exists to be transmitted, and the source access network entity may also purely trigger the target access network entity to acquire the context information of the terminal device, in which a condition for triggering the target access network entity to acquire the context information of the terminal device is not defined by the disclosure.

Therefore, according to the method for wireless communication provided by this embodiment of the disclosure, the transmission indication message transmitted by the source access network entity to the target access network entity carries the context information of the terminal device, so that the target access network entity acquires the context information of the terminal device from the transmission indication message, i.e., the connection between the terminal device and each access network entity is restored, to save the electricity consumption and the network overhead of a terminal and thus improve the mobility performance of the terminal.

It should be understood by a person skilled in the art that, after the downlink data reach to the source access network entity, the source access network entity may determine whether the terminal device is within an own serving range via a method similar to paging; if no, the source access network entity may transmit the transmission indication message to all access network entities within a certain area around and receives confirmation request messages from all access network entities of the transmission indication message to the terminal device, the confirmation request messages carry the identification information of the terminal device and are used for searching whether the terminal device is within the own serving range; and if some access network entity receives a confirmation response message from the terminal device, it is indicated that the terminal device is located within a serving range of the access network entity and the access network entity is the above target access network entity. For example, all access network entities that receive the transmission indication message transmit paging messages to the terminal device. In this solution, a signaling connection is respectively established between the access network entities and the terminal device. That is, the access network entities know that which channel the terminal device is operated at present and transmit the paging messages to the terminal device via a special control channel. The terminal device that receives the paging messages transmits a paging response message to the target access network entity, i.e., to notify the target access network entity of that the terminal device is within the own serving range, so that subsequence communication is performed between the terminal device and the target access network entity.

Alternatively, as an embodiment, after the first access network entity receives the confirmation response message from the terminal device, the method further includes: the target access network entity transmits first indication information to the source access network entity, the first indication information being configured to instruct the source access network entity to delete the context information of the terminal device and/or indicating the source access network entity of transmitting the downlink data or downlink signaling to be transmitted to the target access network entity, and/or the target access network entity transmits second indication information to a CN element, the second indication information being configured to instruct the CN element to delete a path between the CN element serving the terminal device and the second access network entity and establishing a path between the CN element serving the terminal device and the first access network entity.

It should be understood that, the first indication information and the second indication information in the method 700 are similar to those in each method and will not be repeated here for the conciseness.

Alternatively, as an embodiment, the confirmation request message carries timing information of a timer or a counter; the method further includes: if a time set by the timer or the counter is overtime, the first access network entity terminates to transmit the confirmation request message to the terminal device.

Alternatively, the confirmation request message is transmitted within a time quantum set by the timer or the counter.

FIG. 8 illustrates a schematic block diagram of a method for wireless communication 800 provided by an embodiment of the disclosure. The method 800 illustrated in FIG. 8 includes the following actions.

At S810, a second access network entity determines that downlink data or downlink signaling to be transmitted to the terminal device exists.

At S820, the second access network entity transmits a transmission indication message to at least one access network entity in a first area, the transmission indication message being configured to existence of the downlink data or downlink signaling to be transmitted to the terminal device and the transmission indication message carrying context information of the terminal device.

Specifically, when a network side has data to be transmitted, a path between the CN element relevant to the terminal device and an access network entity still is a path between the CN element and the source access network entity, and the data at the network side first reach to the source access network entity. However, at this moment, the terminal device is not within a range served by the source access network entity, so the source access network entity may transmit the transmission indication message to at least one access network entity within a certain area around, in which the transmission indication message is configured to notify the at least one access network entity of having the data to be transmitted and the transmission indication message carries the context information of the terminal device. The certain area may be an area affected by the source access network entity. In other words, the source access network entity may affect all access network entities in the area to transmit the transmission indication message.

It should be understood that, in this embodiment of the disclosure, the source access network entity may transmit the transmission indication message when the uplink data or uplink signaling exists to be transmitted, and the source access network entity may also purely trigger the target access network entity to acquire the context information of the terminal device, in which a condition for triggering the target access network entity to acquire the context information of the terminal device is not defined by the disclosure.

Further, the at least one access network entity includes the target access network entity and the target access network entity is an access network entity providing a service for the terminal device; the method further includes: the source access network entity receives first indication information from the target access network entity, the first indication information being configured to instruct the source access network entity to delete the context information of the terminal device and/or indicating the source access network entity of transmitting the downlink data or downlink signaling to be transmitted to the target access network entity; and the source access network entity deletes the context information of the terminal device and/or transmits the downlink data or downlink signaling to be transmitted to the target access network entity according to the first indication information.

Still further, after the source access network entity receives the first indication information, the method further includes: the source access network entity transmits second indication information to a CN element, the second indication information being configured to instruct the CN element to delete a path between the CN element serving the terminal service and the second access network entity and establishing a path between the CN element serving the terminal device and the first access network entity, and/or the source access network entity notifies each access network entity in the at least one access network entity of terminating to transmit a confirmation request message to the terminal device, the confirmation request message being configured to confirm whether a corresponding access network entity is an access network entity currently serving the terminal device or not.

Therefore, according to the method for wireless communication provided by this embodiment of the disclosure, the transmission indication message transmitted by the source access network entity to the target access network entity carries the context information of the terminal device, so that the target access network entity acquires the context information of the terminal device from the transmission indication message, i.e., the connection between the terminal device and each access network entity is restored, to save the electricity consumption and the network overhead of a terminal and thus improve the mobility performance of the terminal.

It should be understood that, a solution for restoring a downlink connection is similar to that for restoring an uplink connection. For example, if the transmission indication message received by the target access network entity carries the context information of the terminal device, the target access network entity may require the source access network entity to delete the context information of the terminal device; and at this moment, the target access network entity or the source access network entity may transmit a path change request to the CN element. The solution here is not repeated for conciseness of the description and may be referred to the solution for restoring the uplink connection specifically.

Figure 9:
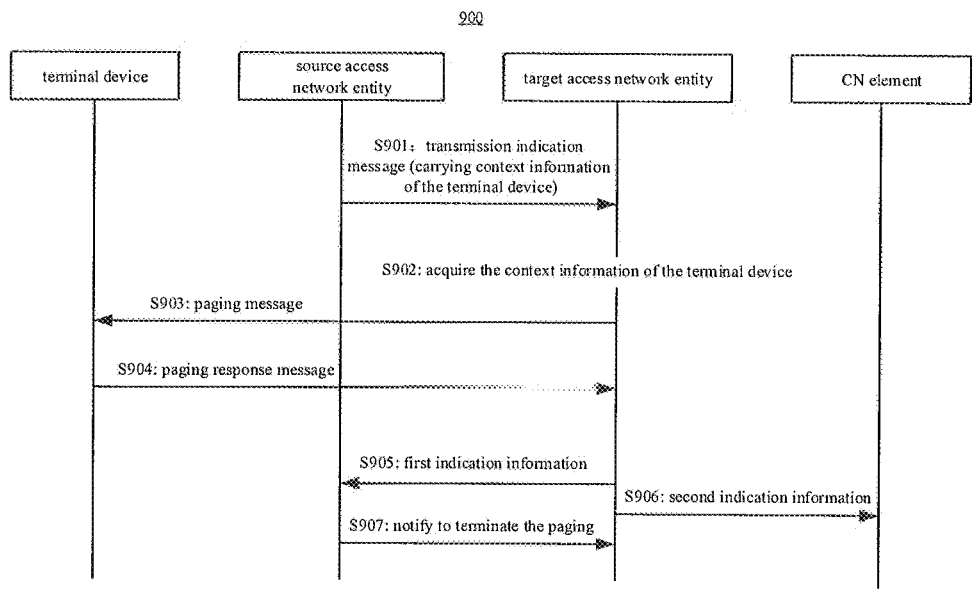
FIG. 9 illustrates another schematic flowchart of a method for wireless communication provided by an embodiment of the disclosure.

The method for wireless communication 900 in the embodiments of the disclosure will be described below in detail from the perspective of interaction among a terminal device, an access network entity and a CN element in combination with FIG. 9. As illustrated in FIG. 9, the method 900 includes the following actions.

At S901, when a network side has data to be transmitted and downlink data reach to a source access network entity, the source access network entity may transmit a transmission indication message to at least one access network entity in a certain area, the transmission indication message being capable of carrying context information of the terminal device.

At S902, each access network entity may transmit a paging message to the terminal device after acquiring the context information of the terminal device.

At S903, the terminal device transmits a paging response message to a target access network entity after receiving the paging messages to notify the target access network entity of that the terminal device is within an own serving range, At S904, the target access network entity may acquire the context information of the terminal device.

At S905, the target access network entity may further transmit first indication information to the source access network entity after receiving a paging response message from the terminal device so as to indicate the source access network entity of deleting the context information of the terminal device.

At S906, the target access network entity may further transmit second indication information to a CN element after acquiring the paging response message transmitted by the terminal device so as to indicate the CN element of deleting a path between the CN element serving the terminal device and the second access network entity and establishing a path between the CN element serving the terminal device and the first access network entity.

At S907, the source access network entity may notify the at least one access network entity of terminating to transmit the paging message after receiving the first indication information.

Therefore, according to the method for wireless communication provided by this embodiment of the disclosure, the transmission indication message transmitted by the source access network entity to the target access network entity carries the context information of the terminal device, so that the target access network entity acquires the context information of the terminal device, i.e., the connection between the terminal device and each access network entity is restored, to save the electricity consumption and the network overhead of a terminal and thus improve the mobility performance of the terminal.

It should be understood that, FIG. 9 illustrates detailed actions or operations of the method for wireless communication. However, these actions or operations are merely for example, and other operations or variations of each operation in FIG. 9 may further be executed by this embodiment of the disclosure. In addition, the each step in FIG. 9 may be executed according to a sequence different from FIG. 9 and it is possible that all operations in FIG. 9 are operated unnecessarily.

In addition, in each method embodiment, the actions at a terminal device side may be independently implemented to form a method for wireless communication at the terminal device side, and the actions at the access network entity side may be independently implemented to form a method for wireless communication at the access network entity side. In each method embodiment above, the access network entity generally is a base station, the CN element generally is an MME and the terminal device generally is a user device.

It should be understood that, the interaction between the network device and the terminal device, relevant characteristics and functions described from the network device side are corresponding to relevant characteristics and functions of the terminal device side and will not be repeated here for the conciseness.

It should be further understood that, in each embodiment of the disclosure, the sequence number of each process does not mean the precedence of the execution sequence, and the execution sequence of each process should be determined based on its function and internal logic and is not intended to form any limit to the implementation process of the embodiment of the disclosure.

The method for wireless communication according to the embodiments of the disclosure is described above in detail in combination with FIG. 3 to FIG. 9. Hereinafter, an apparatus for wireless communication according to the embodiments of the disclosure will be described in combination with FIG. 10 to FIG. 19. Technical characteristics described in the method embodiments may be applied to the following apparatus embodiments.

Figure 10:
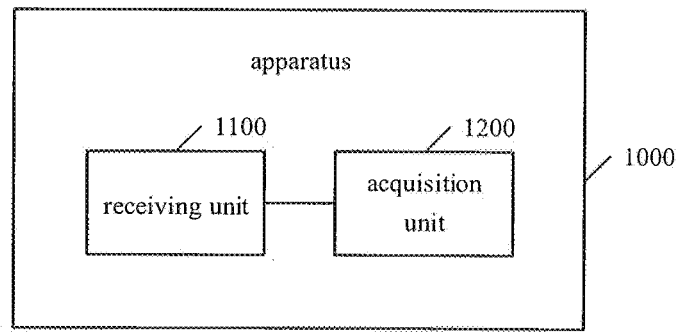
FIG. 10 illustrates a schematic block diagram of an apparatus for wireless communication provided by an embodiment of the disclosure.

FIG. 10 illustrates a schematic block diagram of an apparatus for wireless communication 1000 provided by an embodiment of the disclosure. The apparatus 1000 is a first access network entity. As illustrated in FIG. 10, the apparatus 1000 includes a receiving unit 1100 and an acquisition unit 1200.

The receiving unit 1100 is configured to receive a transmission indication message from a terminal device, the transmission indication message carrying context information of the terminal device and/or identification information of a second access network entity.

The acquisition unit 1200 is configured to acquire the context information of the terminal device according to the transmission indication message so as to establish a connection between the terminal device and the first access network entity.

The technical solutions of the disclosure may be applied to the connection between the terminal device and the apparatus 1000. However, the uplink and downlink information of the terminal device is stored in the second access network entity. In other words, any access network entity may be the second access network entity as long as the uplink and downlink information of the terminal device is stored. For the convenience of description, the apparatus 1000 in this embodiment of the disclosure is referred to as a target access network entity and the second access network entity is referred to a source access network entity.

Specifically, the terminal device may trigger the target access network entity to acquire the context information of the terminal device from the source access network entity via an identifier, carried in the transmission indication message, of the source access network entity; upon the reception of a message of the target access network entity for requesting to acquire the context information of the terminal device, the source access network entity transmits the context information of the terminal device to the target access network entity; or the terminal device directly carries the context information of the terminal device in the transmission indication message, so that the target access network entity may acquire the context information of the terminal device from the transmission indication message.

It should be understood that, in this embodiment of the disclosure, the terminal device may transmit the transmission indication message when uplink data or uplink signaling exists to be transmitted, and the terminal device may also purely trigger the target access network entity to acquire the context information of the terminal device, in which a condition for triggering the target access network entity to acquire the context information of the terminal device is not defined by the disclosure.

Therefore, according to the wireless communication apparatus provided by this embodiment of the disclosure, the terminal device directly transmits the transmission indication message to the apparatus and the context information of the terminal device or the identification information of the source access network entity is carried in the transmission indication message, so that the apparatus acquires the context information of the terminal device, i.e., the connection between the terminal device and each access network entity is restored, to save the electricity consumption and the network overhead of a terminal and thus improve the mobility performance of the terminal.

Alternatively, in this embodiment of the disclosure, when the transmission indication message carries the identification information of the second access network entity, the acquisition unit 1200 is specifically configured to:

transmit a message for requesting to acquire the context information of the terminal device to the second access network entity according to the identification information; and receive the context information, from the second access network entity, of the terminal device.

Alternatively, in this embodiment of the disclosure, when the transmission indication message carries the context information of the terminal device, the acquisition unit 1200 is specifically configured to:

acquire the context information of the terminal device from the transmission indication message.

Alternatively, in this embodiment of the disclosure, the apparatus 1000 further includes a first transmitting unit.

The first transmitting unit is configured to transmit a notification message to the terminal device, the notification message being configured to notify the terminal device that the first access network entity has established a connection for the terminal device.

Alternatively, in this embodiment of the disclosure, the apparatus 1000 further includes a second transmitting unit and a third transmitting unit.

The second transmitting unit is configured to transmit first indication information to the second access network entity, the first indication information being configured to instruct the second access network entity to delete the context information of the terminal device, and/or the third transmitting unit is configured to transmit second indication information to a CN element, the second indication information being configured to instruct the CN element to delete a path between the CN element serving the terminal device and the second access network entity and establishing a path between the CN element serving the terminal device and the first access network entity.

It should be understood that, the apparatus 1000 according to the embodiments of the disclosure may correspond to an execution main body of the method for wireless communication 300 in the embodiments of the disclosure. Furthermore, the above and other operations and/or functions of each module in the apparatus 1000 are intended to implement a corresponding process of each method in FIG. 3 and FIG. 6 and will not be repeated for the conciseness.

Figure 11:
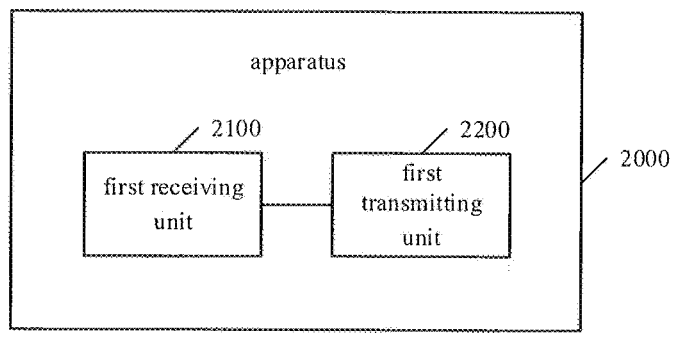
FIG. 11 illustrates another schematic block diagram of an apparatus for wireless communication provided by an embodiment of the disclosure.

FIG. 11 illustrates a schematic block diagram of an apparatus for wireless communication 2000 provided by an embodiment of the disclosure. The apparatus 2000 is a second access network entity. As illustrated in FIG. 11, the apparatus 2000 includes a first receiving unit 2100 and a first transmitting unit 2200.

The first receiving unit 2100 is configured to receive a message from a first access network entity for requesting to acquire context information of the terminal device.

The first transmitting unit 2200 is configured to transmit the context information of the terminal device to the first access network entity according to the message for requesting to acquire the context information of the terminal device.

Therefore, according to the wireless communication apparatus provided by this embodiment of the disclosure, the terminal device directly transmits the transmission indication message to the first access network entity and the context information of the terminal device or identification information of the apparatus is carried in the transmission indication message, so that the first access network entity acquires the context information of the terminal device from the above apparatus, i.e., the connection between the terminal device and each access network entity is restored, to save the electricity consumption and the network overhead of a terminal and thus improve the mobility performance of the terminal.

Alternatively, in this embodiment of the disclosure, the apparatus 2000 further includes a first deletion unit and a second transmitting unit.

The first deletion unit is configured to delete the context information of the terminal device, and/or the second transmitting unit is configured to transmit second indication information to a CN element, the second indication information being configured to instruct the CN element to delete a path between the CN element serving the terminal device and the second access network entity and establishing a path between the CN element serving the terminal device and the first access network entity.

Alternatively, in this embodiment of the disclosure, the apparatus 2000 further includes a second receiving unit, a second deletion unit and a third transmitting unit.

The second receiving unit is configured to receive first indication information from the first access network entity, the first indication information being configured to instruct the second access network entity to delete the context information of the terminal device.

The second deletion unit is configured to delete the context information of the terminal device according to the first indication information, and/or the third transmitting unit is configured to transmit second indication information to a CN element according to the first indication information, the second indication information being configured to instruct the CN element to delete a path between the CN element serving the terminal device and the second access network entity and establishing a path between the CN element serving the terminal device and the first access network entity.

It should be understood that, the apparatus 2000 according to the embodiments of the disclosure may correspond to an execution main body of the method for wireless communication 400 in the embodiments of the disclosure. Furthermore, the above and other operations and/or functions of each module in the apparatus 2000 are intended to implement a corresponding process of each method in FIG. 4 and FIG. 6 and will not be repeated for the conciseness.

Figure 12:
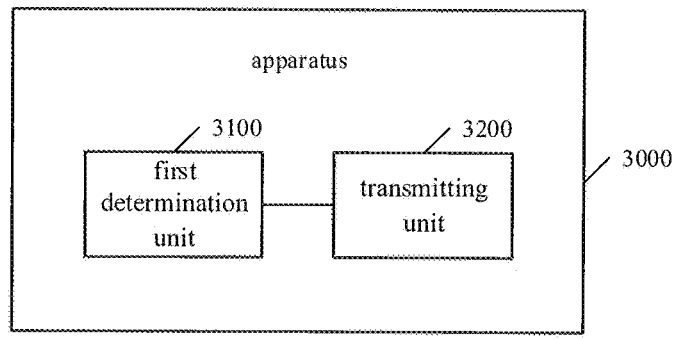
FIG. 12 illustrates a still another schematic block diagram of an apparatus for wireless communication provided by an embodiment of the disclosure.

FIG. 12 illustrates a schematic block diagram of an apparatus for wireless communication 3000 provided by an embodiment of the disclosure. The apparatus 3000 is a first access network entity. As illustrated in FIG. 12, the apparatus 3000 includes a first determination unit 3100 and a transmitting unit 3200.

The first determination unit 3100 is configured to determine a transmission indication message, the transmission indication message carrying context information of a terminal device and/or identification information of a second access network entity.

The transmitting unit 3200 is configured to transmit the transmission indication message to the first access network entity, so that the first access network entity acquires the context information of the terminal device according to the transmission indication message.

Therefore, according to the wireless communication apparatus provided by this embodiment of the disclosure, the terminal device directly transmits the transmission indication message to the first access network entity and the context information of the terminal device and/or the identification information of the second access network entity is carried in the transmission indication message, so that the first access network entity acquires the context information of the terminal device, i.e., the connection between the terminal device and each access network entity is restored, to save the electricity consumption and the network overhead of a terminal and thus improve the mobility performance of the terminal.

Alternatively, in this embodiment of the disclosure, the apparatus 3000 further includes a first receiving unit.

The first receiving unit is configured to receive a notification message from the first access network entity, the notification message being configured to notify the terminal device that the first access network entity has established a connection for the terminal device.

Alternatively, in this embodiment of the disclosure, the transmitting unit is specifically configured to:

enable the terminal device to transmit the transmission indication message to the first access network entity when determining that uplink data or an uplink signaling to be transmitted exists.

Alternatively, in this embodiment of the disclosure, the apparatus 3000 further includes a second determination unit.

The second determination unit is configured to determine an access network entity currently serving the terminal device as the first access network entity.

It should be understood that, the apparatus 3000 according to the embodiments of the disclosure may correspond to an execution main body of the method for wireless communication 500 in the embodiments of the disclosure. Furthermore, the above and other operations and/or functions of each module in the apparatus 3000 are intended to implement a corresponding process of each method in FIG. 3 and FIG. 6 and will not be repeated for the conciseness.

Figure 13:
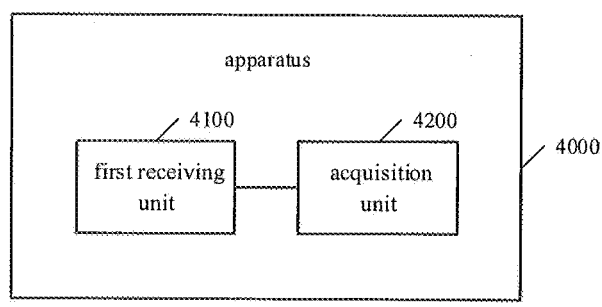
FIG. 13 illustrates a still another schematic block diagram of an apparatus for wireless communication provided by an embodiment of the disclosure.

FIG. 13 illustrates a schematic block diagram of an apparatus for wireless communication 4000 provided by an embodiment of the disclosure. The apparatus 4000 is a first access network entity. As illustrated in FIG. 13, the apparatus 4000 includes a first receiving unit 4100 and an acquisition unit 4200.

The first receiving unit 4100 is configured to receive a transmission indication message from a second access network entity, the transmission indication message indicating existence of downlink data or downlink signaling to be transmitted to a terminal device and the transmission indication message carrying context information of the terminal device.

The acquisition unit 4200 is configured to acquire the context information of the terminal device from the transmission indication message so as to establish a connection between the first access network entity and the terminal device.

Specifically, when a network side has data to be transmitted, a path between the CN element relevant to the terminal device and an access network entity still is a path between the CN element and the source access network entity, and the data at the network side first reach to the source access network entity. However, at this moment, the terminal device is not within a range served by the source access network entity, so the source access network entity may transmit the transmission indication message to all access network entities within a certain area around, in which the transmission indication message is configured to notify the access network entities within the area of having the data to be transmitted and the transmission indication message carries the context information of the terminal device. The certain area may be an area affected by the source access network entity. In other words, the source access network entity may affect all access network entities in the area to transmit the transmission indication message.

It should be understood that, in this embodiment of the disclosure, the source access network entity may transmit the transmission indication message when the uplink data or uplink signaling exists to be transmitted, and the source access network entity may also purely trigger the target access network entity to acquire the context information of the terminal device, in which a condition for triggering the target access network entity to acquire the context information of the terminal device is not defined by the disclosure.

Therefore, according to the wireless communication apparatus provided by this embodiment of the disclosure, the transmission indication message transmitted by the second access network entity to the apparatus carries the context information of the terminal device, so that the apparatus acquires the context information of the terminal device from the transmission indication message, i.e., the data connection is restored, to save the electricity consumption and the network overhead of a terminal and thus improve the mobility performance of the terminal.

Alternatively, in this embodiment of the disclosure, the apparatus 4000 includes a first transmitting unit and a second receiving unit.

The first transmitting unit is configured to transmit a confirmation request message to the terminal device according to the transmission indication message, the confirmation request message being configured to confirm whether the first access network entity is an access network entity currently serving the terminal device or not.

The second receiving unit is configured to receive a confirmation response message from the terminal device, the confirmation response message being used for indicating that the first access network entity is the access network entity currently serving the terminal device.

Alternatively, in this embodiment of the disclosure, the apparatus 4000 includes a second transmitting unit and a third transmitting unit.

The second transmitting unit is configured to transmit first indication information to the second access network entity, the first indication information being configured to instruct the second access network entity to delete the context information of the terminal device and/or indicating the second access network entity of transmitting the downlink data or downlink signaling to be transmitted to the first access network entity, and/or the third transmitting unit is configured to transmit second indication information to a CN element, the second indication information being configured to instruct the CN element to delete a path between the CN element serving the terminal device and the second access network entity and establishing a path between the CN element serving the terminal device and the first access network entity.

Alternatively, in this embodiment of the disclosure, the confirmation request message carries timing information of a timer or a counter. The apparatus 4000 further includes a notification unit.

The notification unit is configured to terminate, if a time set by the timer or the counter is overtime, to transmit the confirmation request message to the terminal device.

It should be understood that, the apparatus 4000 according to the embodiments of the disclosure may correspond to an execution main body of the method for wireless communication 700 in the embodiments of the disclosure. Furthermore, the above and other operations and/or functions of each module in the apparatus 4000 are intended to implement a corresponding process of each method in FIG. 7 and FIG. 9 and will not be repeated for the conciseness.

Figure 14:
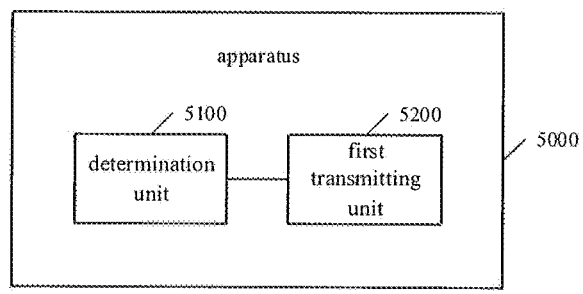
FIG. 14 illustrates a still another schematic block diagram of an apparatus for wireless communication provided by an embodiment of the disclosure.

FIG. 14 illustrates a schematic block diagram of an apparatus for wireless communication 5000 provided by an embodiment of the disclosure. The apparatus 5000 is a second access network entity. As illustrated in FIG. 13, the apparatus 5000 includes a determination unit 5100 and a first transmitting unit 5200.

The determination unit 5100 is configured to determine that downlink data or downlink signaling to be transmitted to the terminal device exists.

The first transmitting unit 5200 is configured to transmit a transmission indication message to at least one access network entity, the transmission indication message being configured to existence of the downlink data or downlink signaling to be transmitted to the terminal device and the transmission indication message carrying context information of the terminal device.

Therefore, according to the wireless communication apparatus provided by this embodiment of the disclosure, the transmission indication message transmitted by the apparatus to the first access network entity carries the context information of the terminal device, so that the first access network entity acquires the context information of the terminal device from the transmission indication message, i.e., the connection between the terminal device and each access network entity is restored, to save the electricity consumption and the network overhead of a terminal and thus improve the mobility performance of the terminal.

Alternatively, in this embodiment of the disclosure, the at least one access network entity includes the first access network entity and the first access network entity is an access network entity currently serving the terminal device. The apparatus 5000 includes a receiving unit, a deletion unit and a second transmitting unit.

The receiving unit is configured to receive first indication information from the first access network entity, the first indication information being configured to instruct the second access network entity to delete the context information of the terminal device and/or indicating the second access network entity of transmitting the downlink data or downlink signaling to be transmitted to the first access network entity.

The deletion unit is configured to delete the context information of the terminal device according to the first indication information, and/or the second transmitting unit is configured to transmit the downlink data or downlink signaling to be transmitted to the first access network entity according to the first indication information.

Alternatively, in this embodiment of the disclosure, the apparatus 5000 further includes a third transmitting unit and a notification unit.

The third transmitting unit is configured to transmit second indication information to a CN element, the second indication information being configured to instruct the CN element to delete a path between the CN element serving the terminal device and the second access network entity and establishing a path between the CN element serving the terminal device and the first access network entity, and/or the notification unit is configured to notify each access network entity in the at least one access network entity of terminating to transmit a confirmation request message to the terminal device, the confirmation request message being configured to confirm whether a corresponding access network entity is an access network entity currently serving the terminal device or not.

It should be understood that, the apparatus 5000 according to the embodiments of the disclosure may correspond to an execution main body of the method for wireless communication 800 in the embodiments of the disclosure. Furthermore, the above and other operations and/or functions of each module in the apparatus 5000 are intended to implement a corresponding process of each method in FIG. 8 and FIG. 9 and will not be repeated for the conciseness.

It is to be noted that, when the apparatus provided by the above embodiments implements its functions, the division of each functional unit is only for example. During an actual application, the functions may be distributed to different functional units as required to be completed, that is, an internal structure of the device is divided into different functional units to complete all or parts of functions described above. In addition, the apparatus provided by the above embodiments and the method embodiments pertain to the same concept and the specific implementation process is referred to the method embodiments and will not be repeated here.

Figure 15:
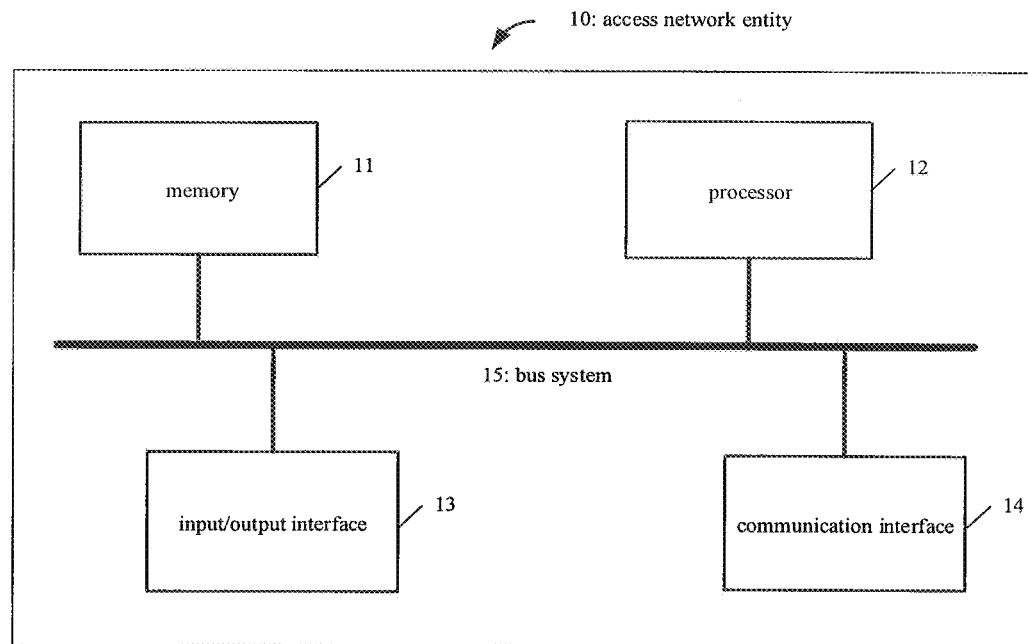
FIG. 15 illustrates a schematic block diagram of an access network entity provided by an embodiment of the disclosure.

FIG. 15 illustrates a schematic block diagram of an access network entity 10 according to an embodiment of the disclosure. The access network entity 10 illustrated in FIG. 15 includes a memory 11, a processor 12, an input/output interface 13, a communication interface 14 and a bus system 15. Herein, the memory 11, the processor 12, the input/output interface 13 and the communication interface 14 are connected via the bus system 15. The memory 11 is configured to store an instruction. The processor 12 is configured to execute the instruction stored by the memory 11 so as to control the input/output interface 13 to receive input data and information, output data such as an operation result and control the communication interface 14 to transmit a signal.

The processor 12 is configured to receive a transmission indication message from a terminal device, the transmission indication message carrying context information of the terminal device and/or identification information of a second access network entity; and acquire the context information of the terminal device according to the transmission indication message so as to establish a connection between the terminal device and the first access network entity.

It should be understood that, in this embodiment of the disclosure, the processor 12 may be a universal Central Processing Unit (CPU), a microprocessor, an Application Specific Integrated Circuit (ASIC), or one or more integrated circuit, and is configured to execute a related procedure to implement the technical solutions provided by this embodiment of the disclosure.

It should be further understood that, the communication interface 14 employs, for example but is not limited to, a transmitter-receiver set such as a transmitter-receiver to implement the communication between the access network entity 10 and other devices or communication networks.

The memory 11 may include a Read-Only Memory (ROM) and a Random-Access Memory (RAM) and provides instructions and data for the processor 13. A part of the processor 12 may further include a nonvolatile random access memory. For example, the processor 12 may further store information on a type of a storage device.

Beside a data bus, the bus system 15 may further include a power bus, a control bus and a state signal bus, etc. For clarity of description, various buses in the figure all are marked as the bus system 15.

In an implementation process, the actions in the foregoing methods may be completed using an integrated logic circuit of hardware in the processor 12 or an instruction in a form of software. Actions of the methods disclosed with reference to the embodiments of the disclosure may be directly executed and accomplished by means of a hardware processor or may be executed and accomplished using a combination of hardware and software modules in the processor. The software module may be located in a mature storage medium in the art, such as a RAM, a flash memory, a ROM, a programmable ROM (PROM), an electrically erasable PROM (EEPROM) or a register. The storage medium is located in the memory 11. The processor 12 reads information from the memory 11 and completes the actions of the foregoing methods in combination with the hardware. To avoid repetition, details are not described herein again.

Alternatively, as an embodiment, when the transmission indication message carries the identification information of the second access network entity, the processor 12 is specifically configured to: transmit a message for requesting to acquire the context information of the terminal device to the second access network entity according to the identification information; and receive the context information, from the second access network entity, of the terminal device.

Alternatively, as an embodiment, when the transmission indication message carries the context information of the terminal device, the processor 12 is specifically configured to: acquire the context information of the terminal device from the transmission indication message.

Alternatively, as an embodiment, the processor 12 is further configured to: transmit a notification message to the terminal device, the notification message being configured to notify the terminal device that the first access network entity has established a connection for the terminal device.

Alternatively, as an embodiment, the processor 12 is further configured to: transmit first indication information to the second access network entity, the first indication information being configured to instruct the second access network entity to delete the context information of the terminal device, and/or transmitting second indication information to a CN element, the second indication information being configured to instruct the CN element to delete a path between the CN element serving the terminal device and the second access network entity and establishing a path between the CN element serving the terminal device and the first access network entity.

Figure 16:
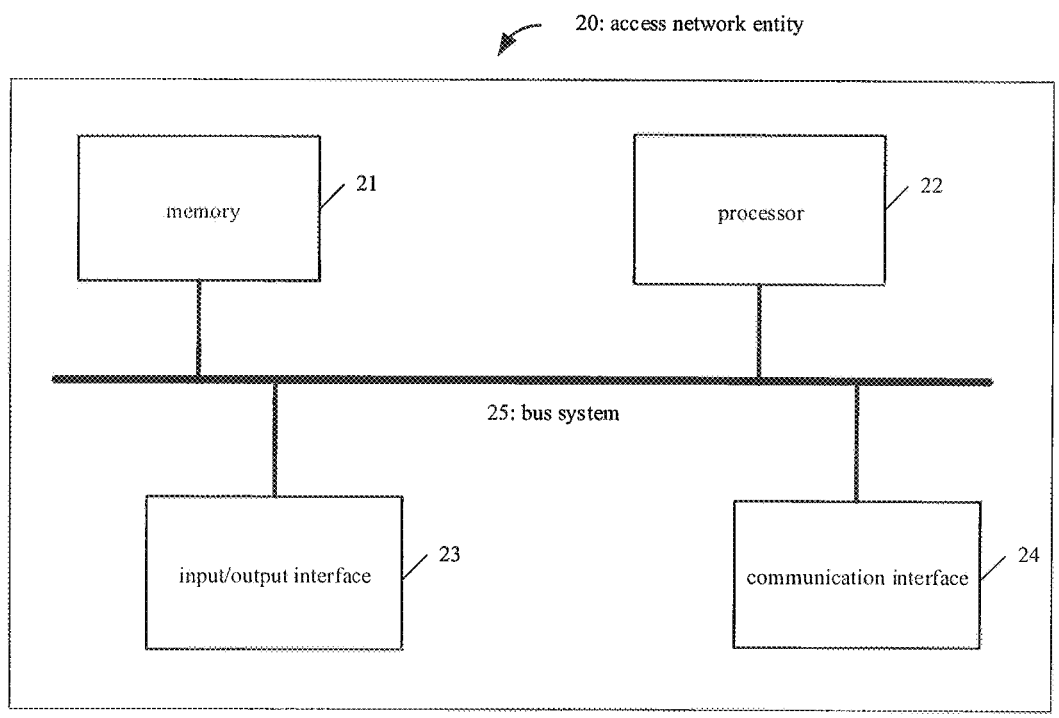
FIG. 16 illustrates another schematic block diagram of an access network entity provided by an embodiment of the disclosure.

FIG. 16 illustrates a schematic block diagram of an access network entity 20 according to an embodiment of the disclosure. The access network entity 20 illustrated in FIG. 16 includes a memory 21, a processor 22, an input/output interface 23, a communication interface 24 and a bus system 25. Herein, the memory 21, the processor 22, the input/output interface 23 and the communication interface 24 are connected via the bus system 25. The memory 21 is configured to store an instruction. The processor 22 is configured to execute the instruction stored by the memory 21 so as to control the input/output interface 23 to receive input data and information, output data such as an operation result and control the communication interface 24 to transmit a signal.

The processor 22 is configured to receive a message from a first access network entity for requesting to acquire context information of a terminal device; and transmit the context information of the terminal device to the first access network entity according to the message for requesting to acquire the context information of the terminal device.

It should be understood that, in this embodiment of the disclosure, the processor 22 may be a universal Central Processing Unit (CPU), a microprocessor, an Application Specific Integrated Circuit (ASIC), or one or more integrated circuit, and is configured to execute a related procedure to implement the technical solutions provided by this embodiment of the disclosure.

It should be further understood that, the communication interface 24 employs, for example but is not limited to, a transmitter-receiver set such as a transmitter-receiver to implement the communication between the access network entity 20 and other devices or communication networks.

The memory 21 may include a Read-Only Memory (ROM) and a Random-Access Memory (RAM) and provides instructions and data for the processor 22. A part of the processor 22 may further include a nonvolatile random access memory. For example, the processor 22 may further store information on a type of a storage device.

Beside a data bus, the bus system 25 may further include a power bus, a control bus and a state signal bus, etc. For clarity of description, various buses in the figure all are marked as the bus system 25.

In an implementation process, the actions in the foregoing methods may be completed using an integrated logic circuit of hardware in the processor 22 or an instruction in a form of software. Actions of the methods disclosed with reference to the embodiments of the disclosure may be directly executed and accomplished by means of a hardware processor or may be executed and accomplished using a combination of hardware and software modules in the processor. The software module may be located in a mature storage medium in the art, such as a RAM, a flash memory, a ROM, a programmable ROM (PROM), an electrically erasable PROM (EEPROM) or a register. The storage medium is located in the memory 22. The processor 22 reads information from the memory 22 and completes the actions of the foregoing methods in combination with the hardware. To avoid repetition, details are not described herein again.

Alternatively, as an embodiment, the processor 12 is further configured to: delete the context information of the terminal device, and/or transmit second indication information to a CN element according to the first indication information, the second indication information being configured to instruct the CN element to delete a path between the CN element serving the terminal device and the second access network entity and establishing a path between the CN element serving the terminal device and the first access network entity.

Alternatively, as an embodiment, the processor 12 is further configured to: receive first indication information from the first access network entity, the first indication information being configured to instruct the second access network entity to delete the context information of the terminal device; and delete the context information of the terminal device according to the first indication information, and/or transmit second indication information to the CN element according to the first indication information, the second indication information being configured to instruct the CN element to delete a path between the CN element serving the terminal device and the second access network entity and establishing a path between the CN element serving the terminal device and the first access network entity.

Figure 17:
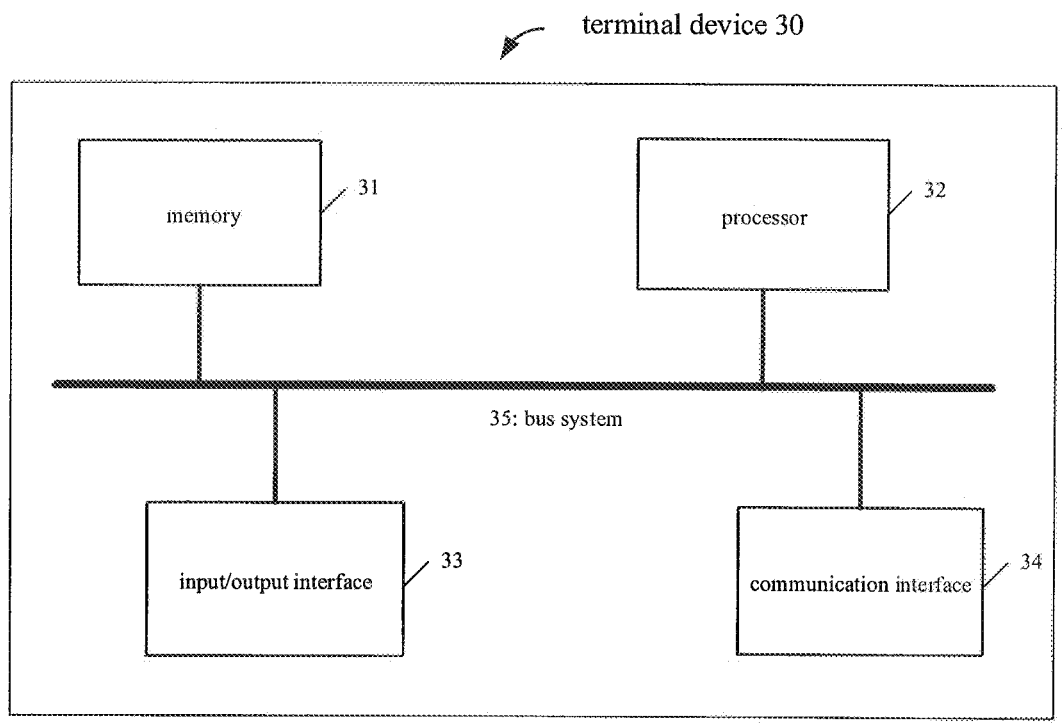
FIG. 17 illustrates a schematic block diagram of a terminal device provided by an embodiment of the disclosure.

FIG. 17 illustrates a schematic block diagram of an access network entity 30 according to an embodiment of the disclosure. The access network entity 30 illustrated in FIG. 17 includes a memory 31, a processor 32, an input/output interface 33, a communication interface 34 and a bus system 35. Herein, the memory 31, the processor 32, the input/output interface 33 and the communication interface 34 are connected via the bus system 35. The memory 31 is configured to store an instruction. The processor 32 is configured to execute the instruction stored by the memory 31 so as to control the input/output interface 33 to receive input data and information, output data such as an operation result and control the communication interface 34 to transmit a signal.

The processor 32 is configured to determine a transmission indication message, the transmission indication message carrying context information of the terminal device and/or identification information of a second access network entity; and transmit the transmission indication message to a first access network entity, so that the first access network entity acquires the context information of the terminal device according to the transmission indication message.

It should be understood that, in this embodiment of the disclosure, the processor 32 may be a universal Central Processing Unit (CPU), a microprocessor, an Application Specific Integrated Circuit (ASIC), or one or more integrated circuit, and is configured to execute a related procedure to implement the technical solutions provided by this embodiment of the disclosure.

It should be further understood that, the communication interface 34 employs, for example but is not limited to, a transmitter-receiver set such as a transmitter-receiver to implement the communication between the access network entity 30 and other devices or communication networks.

The memory 31 may include a Read-Only Memory (ROM) and a Random-Access Memory (RAM) and provides instructions and data for the processor 32. A part of the processor 32 may further include a nonvolatile random access memory. For example, the processor 32 may further store information on a type of a storage device.

Beside a data bus, the bus system 35 may further include a power bus, a control bus and a state signal bus, etc. For clarity of description, various buses in the figure all are marked as the bus system 35.

In an implementation process, the actions in the foregoing methods may be completed using an integrated logic circuit of hardware in the processor 32 or an instruction in a form of software. Actions of the methods disclosed with reference to the embodiments of the disclosure may be directly executed and accomplished by means of a hardware processor or may be executed and accomplished using a combination of hardware and software modules in the processor. The software module may be located in a mature storage medium in the art, such as a RAM, a flash memory, a ROM, a programmable ROM (PROM), an electrically erasable PROM (EEPROM) or a register. The storage medium is located in the memory 31. The processor 32 reads information from the memory 31 and completes the actions of the foregoing methods in combination with the hardware. To avoid repetition, details are not described herein again.

Alternatively, as an embodiment, the processor 32 is further configured to:

receive a notification message from the first access network entity, the notification message being configured to notify the terminal device that the first access network entity has established a connection for the terminal device.

Alternatively, as an embodiment, the processor 32 is further configured to:

transmit the transmission indication message to the first access network entity when determining that uplink data or an uplink signaling to be transmitted exists.

Alternatively, as an embodiment, the processor 32 is further configured to:

determine an access network entity currently serving the terminal device as the first access network entity.

Figure 18:
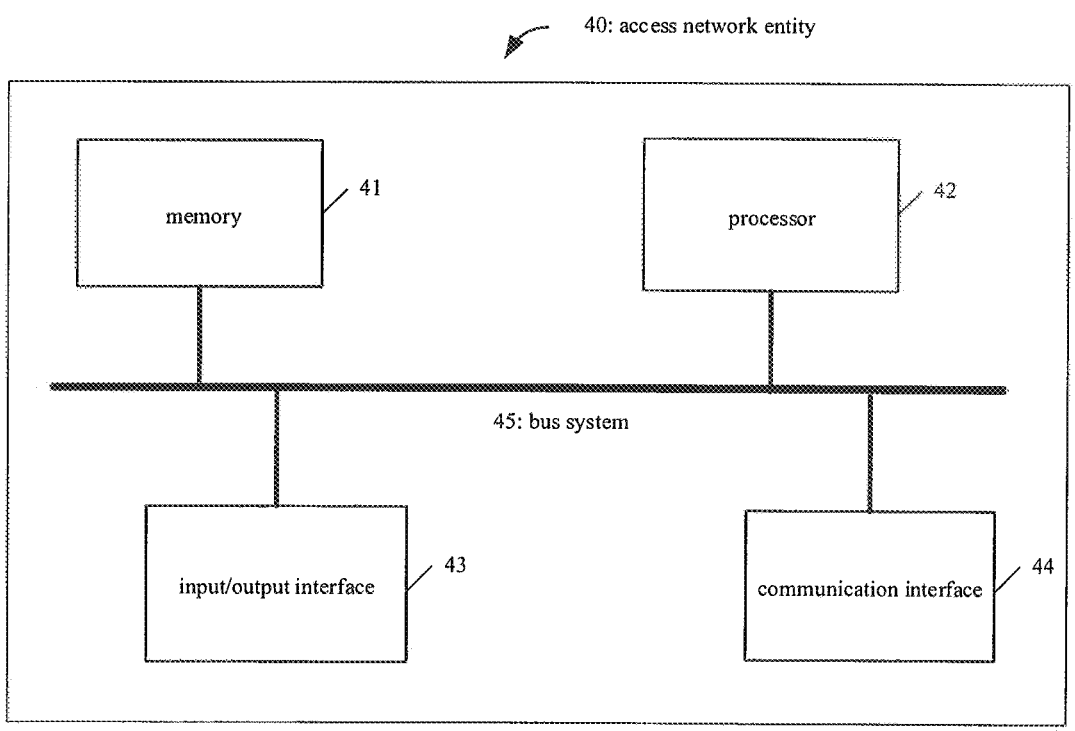
FIG. 18 illustrates a still another schematic block diagram of an access network entity provided by an embodiment of the disclosure.

FIG. 18 illustrates a schematic block diagram of an access network entity 40 according to an embodiment of the disclosure. The access network entity 40 illustrated in FIG. 18 includes a memory 41, a processor 42, an input/output interface 43, a communication interface 44 and a bus system 45. Herein, the memory 41, the processor 42, the input/output interface 43 and the communication interface 44 are connected via the bus system 45. The memory 41 is configured to store an instruction. The processor 42 is configured to execute the instruction stored by the memory 41 so as to control the input/output interface 43 to receive input data and information, output data such as an operation result and control the communication interface 44 to transmit a signal.

The processor 42 is configured to receive a transmission indication message from a second access network entity, the transmission indication message indicating existence of downlink data or downlink signaling to be transmitted to a terminal device and the transmission information message carrying context information of the terminal device; and acquire the context information of the terminal device from the transmission indication message so as to establish a connection between the first access network entity and the terminal device.

It should be understood that, in this embodiment of the disclosure, the processor 42 may be a universal Central Processing Unit (CPU), a microprocessor, an Application Specific Integrated Circuit (ASIC), or one or more integrated circuit, and is configured to execute a related procedure to implement the technical solutions provided by this embodiment of the disclosure.

It should be further understood that, the communication interface 44 employs, for example but is not limited to, a transmitter-receiver set such as a transmitter-receiver to implement the communication between the access network entity 40 and other devices or communication networks.

The memory 41 may include a Read-Only Memory (ROM) and a Random-Access Memory (RAM) and provides instructions and data for the processor 42. A part of the processor 42 may further include a nonvolatile random access memory. For example, the processor 42 may further store information on a type of a storage device.

Beside a data bus, the bus system 45 may further include a power bus, a control bus and a state signal bus, etc. For clarity of description, various buses in the figure all are marked as the bus system 45.

In an implementation process, the actions in the foregoing methods may be completed using an integrated logic circuit of hardware in the processor 42 or an instruction in a form of software. Actions of the methods disclosed with reference to the embodiments of the disclosure may be directly executed and accomplished by means of a hardware processor or may be executed and accomplished using a combination of hardware and software modules in the processor. The software module may be located in a mature storage medium in the art, such as a RAM, a flash memory, a ROM, a programmable ROM (PROM), an electrically erasable PROM (EEPROM) or a register. The storage medium is located in the memory 41. The processor 42 reads information from the memory 41 and completes the actions of the foregoing methods in combination with the hardware. To avoid repetition, details are not described herein again.

Alternatively, as an embodiment, the processor 42 is further configured to: transmit a confirmation request message to the terminal device according to the transmission indication message, the confirmation request message being configured to confirm whether the first access network entity is an access network entity currently serving the terminal device or not; and receive a confirmation response message from the terminal device, the confirmation response message being used for indicating that the first access network entity is the access network entity currently serving the terminal device.

Alternatively, as an embodiment, the processor 42 is further configured to:

transmit first indication information to the second access network entity, the first indication information being configured to instruct the second access network entity to delete the context information of the terminal device and/or indicating the second access network entity of transmitting the downlink data or downlink signaling to be transmitted to the first access network entity, and/or transmit second indication information to a CN element, the second indication information being configured to instruct the CN element to delete a path between the CN element serving the terminal device and the second access network entity and establishing a path between the CN element serving the terminal device and the first access network entity.

Alternatively, in this embodiment of the disclosure, the confirmation request message carries timing information of a timer or a counter. The processor 42 is further configured to:

terminate, if a time set by the timer or the counter is overtime, to transmit the confirmation request message to the terminal device.

Figure 19:
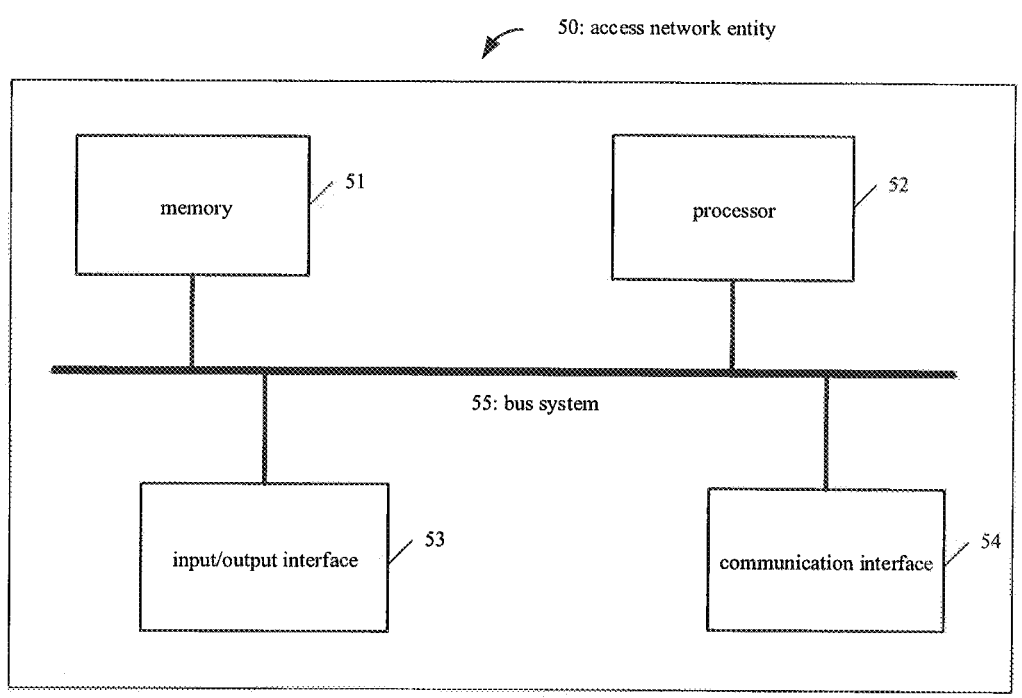
FIG. 19 illustrates a still another schematic block diagram of an access network entity provided by an embodiment of the disclosure.

FIG. 19 illustrates a schematic block diagram of an access network entity 50 according to an embodiment of the disclosure. The access network entity 5 illustrated in FIG. 19 includes a memory 51, a processor 52, an input/output interface 53, a communication interface 54 and a bus system 55. Herein, the memory 51, the processor 52, the input/output interface 53 and the communication interface 54 are connected via the bus system 55. The memory 51 is configured to store an instruction. The processor 52 is configured to execute the instruction stored by the memory 51 so as to control the input/output interface 53 to receive input data and information, output data such as an operation result and control the communication interface 54 to transmit a signal.

The processor 52 is configured to determine that downlink data or downlink signaling to be transmitted to the terminal device exists; and transmit a transmission indication message to at least one access network entity, the transmission indication message being configured to existence of the downlink data or downlink signaling to be transmitted to the terminal device and the transmission indication message carrying context information of the terminal device.

It should be understood that, in this embodiment of the disclosure, the processor 52 may be a universal Central Processing Unit (CPU), a microprocessor, an Application Specific Integrated Circuit (ASIC), or one or more integrated circuit, and is configured to execute a related procedure to implement the technical solutions provided by this embodiment of the disclosure.

It should be further understood that, the communication interface 54 employs, for example but is not limited to, a transmitter-receiver set such as a transmitter-receiver to implement the communication between the access network entity 50 and other devices or communication networks.

The memory 51 may include a Read-Only Memory (ROM) and a Random-Access Memory (RAM) and provides instructions and data for the processor 52. A part of the processor 52 may further include a nonvolatile random access memory. For example, the processor 52 may further store information on a type of a storage device.

Beside a data bus, the bus system 55 may further include a power bus, a control bus and a state signal bus, etc. For clarity of description, various buses in the figure all are marked as the bus system 55.

In an implementation process, the actions in the foregoing methods may be completed using an integrated logic circuit of hardware in the processor 52 or an instruction in a form of software. Actions of the methods disclosed with reference to the embodiments of the disclosure may be directly executed and accomplished by means of a hardware processor or may be executed and accomplished using a combination of hardware and software modules in the processor. The software module may be located in a mature storage medium in the art, such as a RAM, a flash memory, a ROM, a programmable ROM (PROM), an electrically erasable PROM (EEPROM) or a register. The storage medium is located in the memory 51. The processor 52 reads information from the memory 51 and completes the actions of the foregoing methods in combination with the hardware. To avoid repetition, details are not described herein again.

Alternatively, in this embodiment of the disclosure, the at least one access network entity includes the first access network entity and the first access network entity is an access network entity currently serving the terminal device. The processor 42 is further configured to:

receive first indication information from the first access network entity, the first indication information being configured to instruct the second access network entity to delete the context information of the terminal device and/or indicating the second access network entity of transmitting the downlink data or downlink signaling to be transmitted to the first access network entity; and delete the context information of the terminal device and/or transmit the downlink data or downlink signaling to be transmitted to the first access network entity according to the first indication information.

Alternatively, as an embodiment, the processor 42 is further configured to: transmit second indication information to a CN element, the second indication information being configured to instruct the CN element to delete a path between the CN element serving the terminal device and the second access network entity and establishing a path between the CN element serving the terminal device and the first access network entity, and/or notify each access network entity in the at least one access network entity of terminating to transmit a confirmation request message to the terminal device, the confirmation request message being configured to confirm whether a corresponding access network entity is an access network entity currently serving the terminal device or not.

It should be understood that, in this embodiment of the disclosure, "B corresponding to A" represents that the B is associated with the A and the B may be determined according to the A. However, it should be further understood that the B is determined according to the A, which does not mean the B is determined only according to the A and the B may further be determined according to the A and/or other information.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in each embodiment of the disclosure, sequence numbers of the foregoing processes do not mean execution sequences in various embodiments of the disclosure. The execution sequences of the processes should be determined according to functions and internal logic of the processes, and should not be construed as any limitation on the implementation processes of the embodiments of the disclosure.

A person of ordinary skill in the art may be aware that, in combination with the examples described in the embodiments disclosed in this specification, units and algorithm actions may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the actions of the methods described in the embodiments of the disclosure. The foregoing storage medium includes any medium that can store program code, such as a universal serial bus (USB) flash drive, a removable hard disk, a ROM, a RAM, a magnetic disk, or an optical disc.

The foregoing descriptions are merely implementations of the disclosure but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

The invention claimed is:

1. A method for wireless communication, comprising:
receiving, by a first access network entity, a transmission indication message from a terminal device or a second access network entity; and
acquiring, by the first access network entity, the context information of the terminal device according to the transmission indication message, so as to establish a connection between the terminal device and the first access network entity, wherein the context information of the terminal device comprises service information established by the second access network entity for the terminal device, or the context information of the terminal device comprises the service information established by the second access network entity for the terminal device and capability information of the terminal device; and the context information of the terminal device allows the first access network entity to provide a service for the terminal device based on it;
wherein the transmission indication message from the terminal device carries the context information of the terminal device, or the transmission indication message from the terminal device carries the context information of the terminal device and identification information of the second access network entity; or
wherein the transmission indication message indicates existence of downlink data or downlink signaling to be transmitted to the terminal device, and the transmission indication message carries the context information of the terminal device.

2. The method of claim 1, wherein when the transmission indication message carries the identification information of the second access network entity, acquiring, by the first access network entity, the context information of the terminal device according to the transmission indication message comprises:
transmitting, by the first access network entity, a message for requesting to acquire the context information of the terminal device to the second access network entity according to the identification information; and
receiving, by the first access network entity, the context information of the terminal device from the second access network entity.

3. The method of claim 1, wherein when the transmission indication message carries the context information of the terminal device, acquiring, by the first access network entity, the context information of the terminal device according to the transmission indication message comprises:
acquiring, by the first access network entity, the context information of the terminal device from the transmission indication message.

4. The method of claim 1, after acquiring, by the first access network entity, the context information of the terminal device according to the transmission indication message, further comprising:
transmitting, by the first access network entity, a notification message to the terminal device, the notification message being configured to notify the terminal device that the first access network entity has established the connection for the terminal device.

5. The method of claim 1, after acquiring, by the first access network entity, the context information of the terminal device according to the transmission indication message, further comprising:
transmitting, by the first access network entity, first indication information to the second access network entity, the first indication information being configured to instruct the second access network entity to delete the context information of the terminal device.

6. The method of claim 1, before acquiring, by the first access network entity, the context information of the terminal device from the transmission indication message, further comprising:
transmitting, by the first access network entity, a confirmation request message to the terminal device according to the transmission indication message, the confirmation request message being configured to confirm whether the first access network entity is an access network entity currently serving the terminal device or not; and
receiving, by the first receiving unit, a confirmation response message from the terminal device, the confirmation response message being used for indicating that the first access network entity is the access network entity currently serving the terminal device.

7. The method of claim 6, after receiving, by the first access network entity, a confirmation response message from the terminal device, further comprising:
transmitting, by the first access network entity, first indication information to the second access network entity, the first indication information being used for instruct the second access network entity to perform at least one of the following: delete the context information of the terminal device, or transmit the downlink data or downlink signaling to be transmitted to the first access network entity.

8. The method of claim 6, wherein the confirmation request message carries timing information of a timer or a counter, and the method further comprises:
when a time set by the timer or the counter is overtime, terminating, by the first access network entity, to transmit the confirmation request message to the terminal device.

9. The method of claim 6, after receiving, by the first access network entity, a confirmation response message from the terminal device, further comprising:
transmitting, by the first access network entity, second indication information to a Core Network (CN) element, the second indication information being configured to instruct the CN element to delete a path between the CN element serving the terminal device and the second access network entity and establish a path between the CN element serving the terminal device and the first access network entity.

10. The method of claim 1, after acquiring, by the first access network entity, the context information of the terminal device according to the transmission indication message, further comprising:
transmitting, by the first access network entity, second indication information to a Core Network (CN) element, the second indication information being configured to instruct the CN element to delete a path between the CN element serving the terminal device and the second access network entity and establish a path between the CN element serving the terminal device and the first access network entity.

11. A method for wireless communication, comprising:
receiving, by a second access network entity, a message from a first access network entity for requesting to acquire context information of a terminal device, wherein the context information of the terminal device comprises service information established by the second access network entity for the terminal device, or the context information of the terminal device comprises the service information established by the second access network entity for the terminal device and capability information of the terminal device; and
transmitting, by the second access network entity, the context information of the terminal device to the first access network entity according to the message for requesting to acquire the context information of the terminal device, wherein the context information of the terminal device allows the first access network entity to provide a service for the terminal device based on it.

12. The method of claim 11, after transmitting, by the second access network entity, the context information of the terminal device to the first access network entity, further comprising:
deleting, by the second access network entity, the context information of the terminal device.

13. The method of claim 11, further comprising:
receiving, by the second access network entity, first indication information from the first access network entity, the first indication information being configured to instruct the second access network entity to delete the context information of the terminal device; and
deleting, by the second access network entity, the context information of the terminal device according to the first indication information.

14. The method of claim 11, after transmitting, by the second access network entity, the context information of the terminal device to the first access network entity, further comprising:
transmitting, by the second access network entity, second indication information to a Core Network (CN) element, the second indication information being configured to instruct the CN element to delete a path between the CN element serving the terminal device and the second access network entity and establish a path between the CN element serving the terminal device and the first access network entity.

15. The method of claim 11, further comprising:
receiving, by the second access network entity, first indication information from the first access network entity, the first indication information being configured to instruct the second access network entity to delete the context information of the terminal device; and
transmitting, by the second access network entity, second indication information to a Core Network (CN) element according to the first indication information, the second indication information being configured to instruct the CN element to delete a path between the CN element serving the terminal device and the second access network entity and establish a path between the CN element serving the terminal device and the first access network entity.

16. A method for wireless communication, comprising:
determining, by a terminal device, a transmission indication message, the transmission indication message carrying context information of the terminal device or the transmission indication message carrying the context information of the terminal device and identification information of a second access network entity, wherein the context information of the terminal device comprises service information established by the second access network entity for the terminal device, or the context information of the terminal device comprises the service information established by the second access network entity for the terminal device and capability information of the terminal device; and transmitting, by the terminal device, the transmission indication message to a first access network entity, so as for the first access network entity to acquire the context information of the terminal device according to the transmission indication message and to provide a service for the terminal device based on the context information of the terminal device.

17. The method of claim 16, further comprising:

receiving, by the terminal device, a notification message from the first access network entity, the notification message being configured to notify the terminal device that the first access network entity has established the connection for the terminal device.

18. The method of claim 16, wherein transmitting, by the terminal device, the transmission indication message to the first access network entity comprises:

when the terminal device determines existence of uplink data or uplink signaling to be transmitted, transmitting, by the terminal device, the transmission information message to the first access network entity.

19. The method of claim 16, before transmitting, by the terminal device, the transmission indication message to the first access network entity, further comprising:

determining, by the terminal device, an access network entity currently serving the terminal device to be the first access network entity.

* * * * *